(12) United States Patent
Oshita et al.

(10) Patent No.: US 11,566,129 B2
(45) Date of Patent: Jan. 31, 2023

(54) THERMOPLASTIC ELASTOMER COMPOSITION

(71) Applicant: KURARAY CO., LTD., Kurashiki (JP)

(72) Inventors: Shinya Oshita, Houston, TX (US); Heith Foster, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 277 days.

(21) Appl. No.: 17/085,354

(22) Filed: Oct. 30, 2020

(65) Prior Publication Data

US 2021/0130602 A1    May 6, 2021

Related U.S. Application Data

(60) Provisional application No. 62/931,324, filed on Nov. 6, 2019.

(51) Int. Cl.
*C08L 53/02* (2006.01)
*C08L 9/06* (2006.01)
*C08L 23/14* (2006.01)
*C08K 5/103* (2006.01)
*C08K 5/01* (2006.01)

(52) U.S. Cl.
CPC ............. *C08L 53/025* (2013.01); *C08L 23/14* (2013.01); *C08K 5/01* (2013.01); *C08K 5/103* (2013.01); *C08L 9/06* (2013.01); *C08L 2203/16* (2013.01); *C08L 2205/025* (2013.01); *C08L 2205/035* (2013.01); *C08L 2205/22* (2013.01); *C08L 2207/04* (2013.01)

(58) Field of Classification Search
None
See application file for complete search history.

*Primary Examiner* — Richard A Huhn
(74) *Attorney, Agent, or Firm* — Oblon, McClelland, Maier & Neustadt, L.L.P.

(57) ABSTRACT

A thermoplastic elastomer composition possessing a good combination of elastic recovery, tear strength at 25° C., stress relaxation and reduced (improved) anisotropy, which is based on a hydrogenated block copolymer (A), a thermoplastic resin (B), a rubber softener (C) and a polyolefin elastomer (D), of specified types and proportions, and which is suitable for use in a variety of film and sheet applications.

15 Claims, 4 Drawing Sheets

THERMOPLASTIC ELASTOMER COMPOSITION

CROSS-REFERENCE TO RELATED APPLICATIONS

This application claims priority under 35 U.S.C. § 119 from U.S. Provisional Application Ser. No. 62/931,324 (filed 6 Nov. 2019), the disclosure of which is incorporated by reference herein for all purposes as if fully set forth.

FIELD OF THE INVENTION

The present invention relates to a thermoplastic elastomer composition based on a hydrogenated block copolymer (A), a thermoplastic resin (B), a rubber softener (C), and a polyolefin elastomer (D) of specified types and proportions as detailed below. The thermoplastic elastomer compositions of the present invention possess a good combination of elastic recovery, tear strength, stress relaxation and reduced (improved) anisotropy, making them suitable for use in a variety of film and sheet applications.

BACKGROUND OF THE INVENTION

Among hydrogenated block copolymers, hydrogenated styrenic thermoplastic elastomers are thermoplastic elastomers excellent in weather resistance, heat resistance, impact resistance, flexibility and elastic recovery. Compositions containing hydrogenated block copolymers are used in a wide range of fields such as automotive, consumer electronics, medical, construction, toys, daily necessities and sundries to provide excellent mechanical strength, flexibility, weather resistance, ozone resistance, thermal stability and transparency.

Especially in applications such as films and sheets, elastic recoverability, tear strength at 25° C. and stress relaxation properties are required, and in order to satisfy these physical properties, a method of using a mixture of a hydrogenated styrenic thermoplastic elastomer, a plasticizer and various thermoplastic resins has been proposed.

For example, U.S. Pat. No. 9,321,874B2 generally discloses a thermoplastic elastomer composition that contains a hydrogenated styrenic block copolymer, a thermoplastic resin and a rubber softener. More specifically, U.S. Pat. No. 9,056,975B2 discloses a thermoplastic elastomer composition containing 55-60% by weight of a hydrogenated SEEPS block copolymer having a specified number-average molecular weight and mass ratio of isoprene/1,3-butadiene, 7-12% by weight of a polystyrene (thermoplastic resin), 15-30% by weight of an oil (rubber softener) and 5-20% by weight of an aliphatic hydrogenated hydrocarbon resin (tackifier).

The elastomer compositions described in the above-incorporated documents can satisfactorily satisfy the elastic recovery, tear strength, and stress relaxation properties required for applications such as films and sheets; however, the disclosed compositions may have a problem of anisotropy.

Generally anisotropy is the orientation of the molecules in a material during processing. This orientation causes a difference in properties of the finished good depending on the direction in which the article is stressed. This can cause easy activation of tearing in the oriented direction or weaker properties opposite the orientation. These orientation effects can be overcome with design processes but these added processes can add unneeded extra cost.

It is an object of the present invention to provide a thermoplastic elastomer composition having a good combination of elastic recovery, tear strength at 25° C., stress relaxation and reduced (improved) anisotropy.

SUMMARY OF THE INVENTION

The present invention addresses the above problem by providing a thermoplastic elastomer composition having a good combination of elastic recovery, tear strength at 25° C., stress relaxation and low anisotropy, the composition comprising a hydrogenated block copolymer (A), a thermoplastic resin (B), a rubber softener (C), and a polyolefin elastomer (D), of specific types and proportions, as detailed below.

More specifically, the present invention provides a thermoplastic elastomer composition comprising a hydrogenated block copolymer component (A), a thermoplastic resin component (B) and a rubber softener component (C), wherein:

(1) the hydrogenated block copolymer component (A) comprises a hydrogenated block copolymer having
 (i) two or more polymer blocks (a) containing structural units derived from an aromatic vinyl compound, and one or more polymer blocks (b) containing a structural unit derived from isoprene and/or a structural unit derived from 1,3-butadiene;
 (ii) a glass transition temperature of less than about −45° C. (measured as set forth in the examples), and
 (iii) a crystallization peak temperature (Tc) of from about −3 to about 15° C. (measured as set forth in the examples);

(2) the thermoplastic elastomer composition further comprises a polyolefin elastomer component (D); and (3) the thermoplastic elastomer composition comprises from about 18 to about 60 parts by mass of the hydrogenated block copolymer component (A), from about 3 to about 24 parts by mass of the thermoplastic resin component (B), from about 3 to about 25 parts by mass of the rubber softener component (C), and from about 5 to about 76 parts by mass of a polyolefin elastomer component (D), based on 100 parts by mass (A)+(B)+(C)+(D).

In one embodiment, the thermoplastic elastomer composition has a sea-island structure of a sea phase and an island phase, wherein the sea phase is one of (i) the polyolefin elastomer (D) or (ii) components other than the polyolefin elastomer (D), and the island phase is the other of (i) or (ii), and wherein the island phase comprises a plurality of islands having on average a long axis of about 100 nm or more (measured as set forth in the examples).

In another embodiment, the island phase comprises islands that have on average a long axis of about 5 μm or less and an aspect ratio (long axis/short axis) of about 3 or less (measured as set forth in the examples).

In another embodiment, the polymer block (b) of the hydrogenated block copolymer contains structural units derived from isoprene and structural units derived from 1,3-butadiene.

In another embodiment, a mass ratio of the structural units derived from isoprene to the structural unit derived from 1,3-butadiene is from about 49.9/50.1 to about 40.1/59.9.

In another embodiment, the polymer block (b) of the hydrogenated block copolymer contains only a structural unit derived from 1,3-butadiene.

In another embodiment, a content of the polymer blocks (a) in the hydrogenated block copolymer is from about 20% to about 34% by mass, based on the total mass of the hydrogenated block copolymer.

In another embodiment, the thermoplastic resin component (B) comprises a polystyrene-based resin.

In another embodiment, the thermoplastic elastomer composition further comprises from about 3 to about 15 parts by mass of a hydrogenated block copolymer component (E), based on 100 parts by mass (A)+(B)+(C)+(D)+(E), wherein hydrogenated block copolymer component (E) comprises a hydrogenated block copolymer obtained by hydrogenating a polymer block (x) containing more than about 70% by mass of a structural unit derived from an aromatic vinyl compound and a polymer block (y) containing about 30% by mass or more of a structural unit derived from at least one selected from the group consisting of a conjugated diene compound and isobutylene; and wherein the hydrogenated block copolymer has a glass transition temperature (Tg) of from about −45° C. to about 30° C., and the polymer block (x) in the hydrogenated block copolymer is present in an amount of from about 4% by mass to about 30% by mass, based on the total mass of the hydrogenated block copolymer.

In another embodiment, the polyolefin elastomer (D) contains a polypropylene-based elastomer containing a structural unit derived from ethylene, and the content of the structural unit derived from the ethylene is from about 13.0% by mass to about 15.9% by mass based on the total mass of the polypropylene-based elastomer.

The present invention further provides a film or sheet of the thermoplastic elastomer composition, as well as articles made therefrom (for example, a diaper).

These and other embodiments, features and advantages of the present invention will be more readily understood by those of ordinary skill in the art from a reading of the following detailed description.

DETAILED DESCRIPTION

Figure 1:
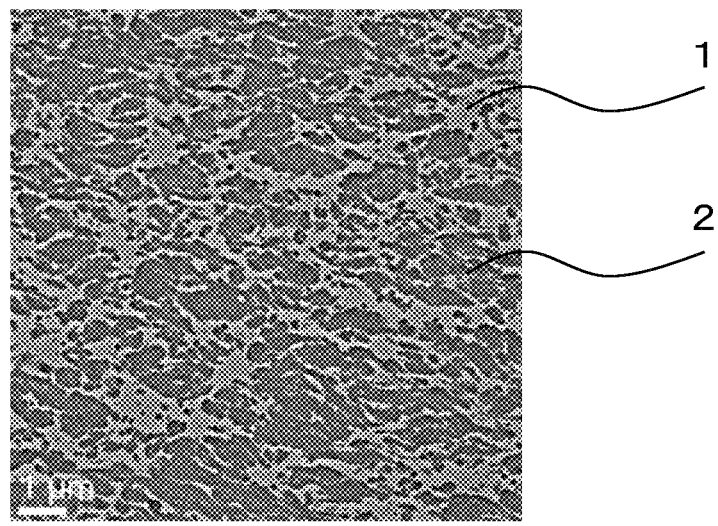
FIG. 1 is a cross-sectional image of the thermoplastic elastomer composition (film) of Example 6 taken (at 2000× magnification) using a transmission electron microscope (TEM).

The present invention will now be illustrated in further detail.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by mass.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an endpoint of a range, the disclosure should be understood to include the specific value or endpoint referred to. In other words, "about 25 to about 50" explicitly discloses the endpoint values of "25" and "50", and the range of "25 to 50".

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a mass basis.

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

The term "number-average molecular weight" or "Mn" means a number-average molecular weight, and the term "weight-average molecular weight" or "Mw" means a weight-average molecular weight, as determined by gel permeation chromatography (GPC) based on a standard polystyrene calibration curve. The measuring apparatuses and conditions are as set forth in the Examples.

Crystallization peak temperature (Tc) is determined herein using a differential scanning calorimeter (DSC), and is defined as the peak top temperature of the exothermic peak observed when the sample is heated from 30° C. to 150° C. at a temperature-increasing rate of 10° C./min and then cooled to −100° C. at a temperature-decreasing rate of 10° C./min. Measurement is as set forth in the Examples.

The term "thermoplastic" has its normal meaning, namely, a substance that can become plastic on heating and hardens on cooling through multiple cycles, as would be understood by a person of ordinary skill in the relevant art.

The term "elastomer" also has its normal meaning, namely, a substance that has elastic properties, as would be understood by a person of ordinary skill in the relevant art.

The term "substantially uniform mixture" means that the components of the mixture are substantially evenly distributed throughout the mixture on a mass basis. The mixture may have discontinuous domains (of the same or different sizes) of one component in a continuous domain of another component, in which case the discontinuous domains would be substantially evenly distributed within the continuous domain (on a mass basis). The intent is that the level of uniformity is that achievable by common industrial mixing equipment operated under commercially applicable conditions, as would be recognized by a person of ordinary skill in the relevant art.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Hydrogenated Block Copolymer Component (A)

The hydrogenated block copolymer component (A) comprises a hydrogenated block copolymer formed by hydrogenating a block copolymer having (i) two or more polymer blocks (a) containing structural units derived from an aromatic vinyl compound, and one or more polymer blocks (b) containing a structural unit derived from isoprene and/or a structural unit derived from 1,3-butadiene. The resulting hydrogenated block copolymer has a glass transition temperature (Tg) of less than about −45° C., and a crystallization peak temperature (Tc) of from about −3° C. to about 15° C.

One type of hydrogenated block copolymer may be used alone, or two or more types of hydrogenated block copolymers may be used in combination.

The polymer block (a) in the hydrogenated block copolymer preferably contains about 50% by mass or more, or about 80% by mass or more, or about 90% by mass or more, or about 95% by mass or more, or substantially 100% by mass, of structural units derived from an aromatic vinyl compound, based on the total mass of polymer block (a). "Derived from an aromatic vinyl compound" means that the structural unit is a structural unit formed as a result of addition polymerization of an aromatic vinyl compound. Hereinafter, "derived" is used in the same manner.

Suitable aromatic vinyl compounds include, for example, styrene, α-methylstyrene, p-methyl styrene, 2-methyl styrene, 3-methyl styrene, 4-methyl styrene, 4-propyl styrene, 4-cyclohexyl styrene, 4-dodecylstyrene, 2-ethyl-4-benzylstylene, 4-(phenylbutyl)styrene, vinyltoluene, 1-vinylnaphthalene, 2-vinylnaphthalene, and the like. Among these, styrene and α-methylstyrene are preferable, and styrene is more preferable. The polymer block (a) may be composed of only one of these aromatic vinyl compounds, or may be composed of two or more of these aromatic vinyl compounds.

The polymer block (a) may contain structural units derived from co-polymerizable monomers other than aromatic vinyl compounds, for example, conjugated dienes such as isoprene, butadiene, 2,3-dimethyl-butadiene, 1,3-pentadiene, 1,3-hexadiene, farnesene, myrcene and the like, as long as they do not interfere with the object and effect of the present invention. The content of the structural unit derived from the other polymerizable monomer in the polymer block (a) is preferably about 10% by mass or less, or about 5% by mass or less, or about 3% by mass or less, or substantially 0% by mass, based on the total mass polymer block (a).

The polymer block (b) in the hydrogenated block copolymer contains at least one structural unit derived from isoprene and/or at least one structural unit derived from 1,3-butadiene (hereinafter, sometimes simply referred to as butadiene). The polymer block (b) may contain a structural unit derived from isoprene and a structural unit derived from butadiene, and may contain only a structural unit derived from butadiene.

The polymer block (b) in the hydrogenated block copolymer preferably contains at least one of structural units derived from isoprene and structural units derived from butadiene in an amount of about 50% by mass or more, or about 80% by mass or more, or about 90% by mass or more, or about 95% by mass or more, or substantially 100% by mass, based on the total mass polymer block (b). The polymerization form of the polymer block (b) is not particularly limited, and may be random or block.

In addition, from the viewpoint of tensile strength and stress relaxation property, the mass ratio (isoprene/butadiene) of the structural unit derived from isoprene to the structural unit derived from butadiene in the polymer block (b) is preferably from about 49.9/50.1, or from about 49/51, or from about 48/52, to about 40.1/59.9, or to about 41/59, or to about 42/58. The mass ratio is calculated from the H-NMR spectrum using the block-co-polymer prior to addition of hydrogen as described in the Examples.

In addition, when the polymer block (b) contains only a structural unit derived from butadiene, it is possible to further make the tear strength at 32° C. excellent.

In addition, there is no particular limitation on the bonding form of isoprene and butadiene in the polymer block (b), that is, the so-called microstructure. For example, isoprene can be in the form of 1,2-bonds (vinyl bonds), 3,4-bonds (vinyl bonds) or 1,4-bonds, and butadiene can be in the form of 1,2-bonds (vinyl bonds) or 1,4-bonds. Only one of these binding forms may be present, or more than one may be present. In addition, any of these bonding forms may be present in any ratio, but from the standpoint of tensile strength, the amount of 1,4-bonding consisting of structural units of isoprene and butadiene is preferably about 50 mol % or more, or about 60 mol % or more, or about 80 mol % or more, or about 90 mol % or more, based on total mols of units from isoprene and butadiene from the viewpoint of tensile strength. As an upper limit, such amount is preferably about 95 mol % or less. In addition, the 1,4-bond amount composed of a structural unit of butadiene is preferably 20 mol % or more, more preferably 30 mol % or more, still more preferably 35 mol % or more, and is preferably 60 mol % or less, more preferably 50 mol % or less, and still more preferably 45 mol % or less, based on the total mol of butadiene from the viewpoint of tensile strength and flexibility.

In this specification, the 1,4-binding quantities are calculated from the H-NMR spectrum using the block-co-polymer prior to addition of hydrogen according to the methods described in the examples.

In addition, the polymer block (b) may contain structural units derived from other polymerizable monomers (other than structural units derived from isoprene and butadiene), for example, structural units derived from conjugated dienes such as 2,3-dimethyl-butadiene, 1,3-pentadiene, 1,3-hexadiene, farnesene, myrcene etc., and structural units derived from aromatic vinyl compounds such as styrene, α-methylstyrene, 2-methylstyrene, 3-methylstyrene, 4-methyl styrene, 4-propylene, 4-cyclohexylstyrene, 4-dodecyl styrene, 2-ethyl-4-benzylstylene, 4-(phenylbutyl)styrene, vinyl-vinyl 2-vinyl compound, etc., as long as the object and effect of the present invention are not hindered. The content of the structural unit derived from the other polymerizable monomer in the polymer block (b) is preferably about 10% by mass or less, or about 5% by mass or less, or about 3% by mass or less, and or 0% by mass, based on the total mass of polymer block (b).

The polymer block (b) in the hydrogenated block copolymer is hydrogenated preferably at least about 50 mol %, or at least about 80 mol %, or at least about 90 mol %, or at least about 95 mol %, or at least about 96 mol %, up to 100 mol %, of carbon-carbon double bonds in the structural unit derived from isoprene and butadiene from the viewpoint of heat resistance, weather resistance, and tensile strength. This value is sometimes referred to as a hydrogenation rate.

In the above-mentioned hydrogen addition ratio, the content of the carbon-carbon double-binding in the structural units derived from isoprene and butadiene in the polymeric block (b) is measured by the H-NMR spectrum before and after the hydrogen addition, and the ratio is obtained from the measured values. More specifically, the value is measured according to the methods described in the examples.

The polymer block (b) becomes crystalline by hydrogenation of carbon-carbon double bonds. The crystallization peak temperature of the hydrogenated block copolymer can be set to a range described later by comprehensively adjusting the content of butadiene in the polymer block (b), the randomness of isoprene and butadiene chains, the microstructure, the hydrogenation rate, and the like.

In general, when about 12 methylene groups are connected in a linear state, crystallinity is observed. In other words, when three consecutive 1,4-linked butadienes form, crystallinity is observed in the presence of fully hydrogenated chains. On the other hand, when 1,4-bonded polyisoprene is completely hydrogenated, it has an ethylene-propylene alternating copolymer structure and does not have crystallinity. Therefore, in order to increase the crystallization peak temperature, it is effective to increase the butadiene content, increase the butadiene chain, increase the 1,4-bond content, and increase the hydrogenation rate, Conversely, in order to decrease the crystallization peak temperature, it is effective to increase the isoprene content, increase the randomness of the isoprene-butadiene chain, decrease the 1,4-bond amount, and decrease the hydrogenation rate.

Furthermore, the crystallization peak temperature of the hydrogenated block copolymer is also affected by the temperature during the polymerization reaction in the polymer block (b) and the feed rate of isoprene and butadiene. Therefore, in order to obtain a desired crystallization peak temperature, it is necessary to appropriately adjust them. In other words, the crystallization peak temperature of the hydrogenated block copolymer can be controlled to a specific value described later by controlling the temperature during the polymerization reaction, the mass ratio of isoprene and butadiene, and the feed rate of isoprene and butadiene.

The content of the polymer block (a) in the hydrogenated block copolymer is preferably from about 20% by mass, or from about 25% by mass, to about 34% by mass, or to about 33% by mass, based on the total mass of the hydrogenated block copolymer. When the content of the polymer block (a) in the hydrogenated block copolymer is about 20% by mass or more, the tensile strength is excellent, and when it is about 34% by mass or less, the stress relaxation property is excellent. This range is also preferable from the viewpoint of molding workability.

The content of the polymer block (a) in the hydrogenated block copolymer is a value obtained from the H-NMR spectrum after hydrogenation, and more specifically, is a value measured according to the method described in the examples.

The mode of bonding between the polymer block (a) and the polymer block (b) in the hydrogenated block copolymer may be any of linear, branched, radial, or any combination thereof.

For example, when the polymer block (a) is denoted by "A" and the polymer block (b) is denoted by "B", there are listed a triblock copolymer denoted by "A-B-A", a tetrablock copolymer denoted by "A-B-A-B", a pentablock copolymer denoted by "A-B-A-B-A" and "B-A-B-A-B", (A-B)nX type copolymer (X represents a coupling agent residue, n represents an integer of 3 or more), and the like. Among these, as the hydrogenated block copolymer (A), a triblock copolymer represented by "A-B-A" and a tetrablock copolymer represented by "A-B-A-B" are preferable, and a triblock copolymer represented by "A-B-A" is more preferably used from the viewpoint of ease of manufacturing.

Here, in the present specification, when polymer blocks of the same kind are linearly bonded via a bifunctional coupling agent or the like, the entire bonded polymer block is treated as one polymer block. In accordance therewith, including the above examples, polymer blocks which are originally to be represented strictly as Y-X-Y (X represents a coupling residue) are denoted as Y as a whole, except in particular when it is required to distinguish them from a single polymer block Y. Since this type of polymer block containing a coupling agent residue is handled as described above in this specification, for example, a block copolymer containing a coupling agent residue and to be strictly denoted as A-B-X-B-A (X represents a coupling agent residue) is denoted as A-B-A, and is handled as an example of a triblock copolymer.

The glass transition temperature (Tg) of the hydrogenated block copolymer is less than about −45° C. When the glass transition temperature of the hydrogenated block copolymer is about −45° C. or more, the tensile strength and the tear strength may be inferior. From this viewpoint, the glass transition temperature of the hydrogenated block copolymer is preferably from −65° C., or from about −60° C., to less than about −50° C., or to about −51° C.

The above-mentioned glass-transition temperatures can be measured according to JIS K7121:2012, and in particular, can be measured by the methods described in the examples.

The crystallization peak temperature (Tc) of the hydrogenated block copolymer as defined below is from about −3° C. to about 15° C.

If the crystallization peak temperature in the hydrogenated block copolymer is less than about −3° C., the tensile strength may be inferior, and if it exceeds about 15° C., the stress relaxation property may be inferior. From this viewpoint, the crystallization peak temperature is preferably from about 0° C., or from about 2° C., or from about 5° C., to about 14° C., or to about 13° C., or to about 11° C.

The weight average molecular weight (Mw) of the hydrogenated block copolymer is preferably from about 50,000, or from about 60,000, or from about 65,000, or from about 70,000, to about 500,000, or to about 400,000, or to about 300,000, or to about 115,000. When the weight average molecular weight of the hydrogenated block copolymer is about 50,000 or more, the tensile strength is excellent, and when it is about 500,000 or less, the molding processability is excellent.

The molecular weight distribution (Mw/Mn) of the hydrogenated block copolymer is preferably 1.5 or less, or from about 1.01 to about 1.5, or to about 1.3, or to about 1.2, or to about 1.1, or to about 1.05, from the viewpoint of stress-relaxation property.

Note that the hydrogenated block copolymer may have one or more functional groups such as a carboxyl group, a hydroxyl group, an acid anhydride group, an amino group and/or an epoxy group in the molecular chain and/or at the molecular end as long as the effect of the present invention is not significantly impaired.

Method for Producing Hydrogenated Block Copolymer

The hydrogenated block copolymer can be produced by, for example, an anionic polymerization method. Specifically, it can be produced by conducting a polymerization reaction by (1) sequentially polymerizing an aromatic vinyl compound and isoprene and butadiene using an alkyllithium compound as an initiator; (2) sequentially polymerizing an aromatic vinyl compound and isoprene and butadiene using an alkyllithium compound as an initiator, followed by coupling by adding a coupling agent; (3) sequentially polymerizing isoprene and butadiene and then an aromatic vinyl compound using a dilithium compound as an initiator; and the like, followed by a hydrogenation reaction.

The isoprene and butadiene may be separately supplied to the reactor simultaneously to form a mixture in the reactor, or may be supplied to the reactor in a state in which isoprene and butadiene are mixed beforehand, or both of the former method and the latter method may be adopted.

Examples of the alkyllithium compound include methyllithium, ethyllithium, n-butyllithium, sec-butyllithium, tert-butyllithium, and pentyllithium.

Examples of coupling agents include divinylbenzene; polyvalent epoxy compounds such as epoxidized 1,2-polybutadiene, epoxidized soybean oil, 1,3-bis(N,N-glycidylaminomethyl)cyclohexane; halogen compounds such as dimethyldichlorosilane, dimethyldibromosilane, trichlorosilane, methyltrichlorosilane, tetrachlorosilane, tetrachlorotin; ester compounds such as methyl benzoate, ethyl benzoate, phenyl benzoate, diethyl oxalate, diethyl malonate, diethyl adipate, dioctyl adipate, dimethyl phthalate, diethyl phthalate, dimethyl isophthalate, dimethyl terephthalate; carbonated ester compounds such as dimethyl carbonate, diethyl carbonate, diphenyl carbonate; alkoxysilane compounds such as dimethyldimethoxysilane, methyltrimethoxysilane, methyltriethoxysilane, tetramethoxysilane, tetraethoxysilane, bis(trimethoxysilyl)hexane, bis(triethoxysilyl)ethane.

Examples of dilithium compounds include naphthalene dilithium, dithiohexyl benzene, and the like.

The polymerization reaction is preferably carried out in the presence of a solvent. The solvent is not particularly limited as long as it is inert to the initiator and does not adversely affect the reaction, and for example, saturated aliphatic hydrocarbons such as hexane, cyclohexane, heptane, octane, and decane; and aromatic hydrocarbons such as toluene, benzene, and xylene can be mentioned. The polymerization reaction is usually carried out at a temperature of from about 0° C., or from about 30° C., or from about 40° C., or from about 50° C., to about 100° C., or to about 90° C., or to about 80° C., for from a time of about 0.5 hours to about 50 hours from the viewpoint of microstructure control.

In addition, a Lewis base may be used as a cocatalyst in the polymerization reaction. Examples of the Lewis base include ethers such as dimethyl ether, diethyl ether, and tetrahydrofuran; glycol ethers such as ethylene glycol dimethyl ether and diethylene glycol dimethyl ether; and amines such as triethylamine, N, N', N'-tetramethylethylenediamine, and N-methylmorpholine. These Lewis bases may be used alone or in combination of two or more.

The hydrogenation reaction may be carried out following the polymerization reaction, or may be carried out after the block copolymer is once isolated after the polymerization reaction.

When the block copolymer is once isolated after the polymerization reaction, the obtained polymerization reaction liquid is poured into a poor solvent of the block copolymer such as methanol to coagulate the block copolymer, or the polymerization reaction liquid is poured into hot water together with steam to remove the solvent by azeotrope (steam stripping) and then dried, whereby the block copolymer can be isolated.

The hydrogenation reaction of the block copolymer is carried out in presence of a hydrogenation catalyst such as Raney nickel; a heterogeneous catalyst in which a metal such as platinum (Pt), palladium (Pd), ruthenium (Ru), rhodium (Rh), or nickel (Ni) is supported on a carrier such as carbon, alumina, or diatomaceous earth; a transition metal compound (nickel octylate, nickel naphthenate, nickel acetylacetonate, cobalt octylate, cobalt naphthenate, cobalt acetylacetonate, etc.) and a Zieglar-based catalyst consists of a combination of an organoaluminum compound such as triethylaluminum, triisobuthylaluminum, and an organolithium compound; and a metallocene-based catalyst consists of a bis(cyclopentadienyl) transition metal compound such as titanium, zirconium, hafnium, and organometallic compounds such as lithium, sodium, potassium, aluminum, zinc, magnesium. The reaction can be carried out at a reaction temperature of from about 20° C. to about 200° C., a hydrogen pressure of from about 0.1 MPa to about 20 Mpa, and for a time of from about 0.1 hours to 100 hours.

When the polymerization reaction and hydrogenation reaction are performed subsequently, the hydrogenation block copolymer can be isolated by pouring the hydrogenation reaction solution into a poor solvent of the hydrogenation block copolymer such as methanol to solidify, or by pouring the hydrogenation reaction solution into hot water together with steam to remove the solvent azeotropically (steam stripping) and then drying.

The content of the hydrogenated block copolymer component (A) in the thermoplastic elastomer composition is from about 18, or from about 20, or from about 25, to about 60, or to about 55, or to about 50, parts by mass based on 100 parts by mass of the hydrogenated block copolymer component (A), the thermoplastic resin component (B), the rubber softener component (C) and the polyolefin elastomer component (D). If the content of the hydrogenated block copolymer component (A) is less than about 18 parts by mass, the tear strength, the tensile strength, and the stress relaxation property may be inferior, and if it exceeds about 60 parts by mass, the anisotropy may be deteriorated, and the molding workability may be deteriorated.

Thermoplastic Resin Component (B)

Suitable thermoplastic resins for use in the thermoplastic resin component (B) of the present invention include, for example, polystyrene-based resins, polyethylene-based resins, polypropylene-based resins, acrylic resins, polyphenylene ether resins, polycarbonate resins, polyvinyl acetate resins, polyester resins, polyamide resins, polyvinyl chloride resins, petroleum resin, hydrogenated petroleum resin and the like.

The above petroleum resin means a product obtained by polymerizing a fraction containing an unsaturated hydrocarbon monomer which is by-produced by thermal decomposition of petroleum naphtha or the like.

Note that a component corresponding to the polyolefin elastomer (D) to be described later is not included in the thermoplastic resin (B).

One type of thermoplastic resin may be used alone or two or more types may be used in combination. Among them, a polystyrene-based resin is preferably used as the thermoplastic resin (B).

Suitable polystyrene-based resins include, for example, polystyrene (general-purpose polystyrene (GPPS) and high impact-resistant polystyrene (HIPS)), polyorthomethylstyrene, polyparamethylstyrene, polydimethyl styrene, polymethyl styrene, polychlorstyrene, polyisopropyl styrene, polytertiarybutyl styrene, poly-α-methyl styrene, polyethylvinyltoluene, styrene-maleimide copolymers, styrene-N-phenylmaleimide copolymers, styrene-N-phenylmaleimide-acrylonitrile copolymers, styrene-N-phenylmaleimide-methyl methacrylate copolymers, styrene-N-phenylmaleimide-butyl acrylate copolymers, rubber toughened impact-resistance polystyrene, acrylonitrile-styrene copolymer (AS resin), acrylonitrile-butadiene-styrene copolymer (ABS resin), acrylonitrile-ethylene-propylene rubber reinforced styrene copolymers (AES resins), acrylonitrile-polyacrylate ester rubber reinforced styrene copolymers (AAS resins), methyl methacrylate-styrene copolymers (MS resins), methyl methacrylate-butadiene-styrene copolymers (MBS resins), and the like.

In one embodiment, the weight average molecular weight (Mw) of the polystyrene-based resin is preferably in the range of from about 1,000, or from about 2,000, or from about 3,000, to about 400,000, or to about 350,000, or to about 300,000. When the weight average molecular weight of the polystyrene-based resin is about 1,000 or more, the stress relaxation property of the obtained thermoplastic elastomer composition is improved, and the problem of odor and the like is reduced, and when it is about 400,000 or less, the processability of the thermoplastic elastomer composition is improved.

The polystyrene-based resin may one polystyrene-based resin or a combination of two or more polystyrene-based resins, for example, a combination of a polystyrene-based resin having a high molecular weight and a polystyrene-based resin having a low molecular weight.

The weight average molecular weight of such a high molecular weight polystyrene resin is preferably in the range of from about 100,000, or from about 120,000, or from about 150,000, to about 400,000, or to about 350,000, or to about 300,000. When the weight average molecular weight of the polystyrene-based resin having a high molecular weight is about 100,000 or more, the stress relaxation property of the obtained thermoplastic elastomer composition is improved, the problem of odor and the like is reduced, and when it is about 400,000 or less, the processability of the thermoplastic elastomer composition is improved.

The weight average molecular weight of such a low molecular weight polystyrene resin is preferably in the range of from about 1,000, or from about 2,000, or from about 3,000, to less than about 100,000, or to about 50,000, or to about 20,000. When the weight average molecular weight of the low molecular weight polystyrene-based resin is about 1,000 or more, the stress relaxation property of the obtained thermoplastic elastomer composition is improved, the problem of odor and the like is reduced, and when it is less than 100,000, the dispersibility of the thermoplastic elastomer composition is improved. In addition, the tear strength at 25° C. is good.

The Z average molecular weight (Mz) of such a low molecular weight polystyrene resin is preferably in the range of from about 1,000, or from about 2,000, or from about 5,000, to about 30,000, or to about 11,000, or to about 9,000. When the Z-average molecular weight of the polystyrene-based resin having a low molecular weight is within the above range, the tear resistance (Slow) at 25° C. and the tear strength of the Elmendorf test become good.

Note that, in this specification, the Z average molecular weight is a value in terms of standard polystyrene determined by gel permeation chromatography (GPC) measurement.

The glass transition temperature (Tg) of such a low molecular weight polystyrene resin is preferably from about 40° C., or from about 50° C., or from about 60° C., to about 110° C., or to about 95° C., or to about 80° C., from the viewpoint of tear resistance (Slow) at 25° C. and tear strength of the Elmendorf test.

The glass transition temperature can be measured according to JIS K7121:2012.

Such high molecular weight polystyrene-based resins are generally known and commercially available, such as Styrolution PS3190 (INEOS Styrolution America LLC).

Such low molecular weight polystyrene-based resins are also generally known and commercially available, such as Kristalex™5140 (Eastman Chemical Company), Kristalex™3100 (Eastman Chemical Company), Piccotex™120 (Eastman Chemical Company), Piccotex™100 (Eastman Chemical Company).

Examples of suitable polyethylene-based resins include homopolymers of ethylene such as high density polyethylene and low density polyethylene, and various ethylene copolymers where ethylene is the predominant monomer component, such as ethylene-propylene copolymers, ethylene-1-butene copolymers, ethylene-1-hexene copolymers, ethylene-1-heptene copolymers, ethylene-1-octene copolymers, ethylene-4-methyl-1-pentene copolymers, ethylene-1-nonene copolymers, ethylene-1-decene copolymers, ethylene-α-olefin copolymers such as ethylene-vinyl acetate copolymers, ethylene-acrylic acid copolymers, ethylene-acrylic acid ester copolymers, ethylene-methacrylic acid copolymers, ethylene-methacrylic acid copolymers, and ethylene homo- and copolymers modified with maleic acid anhydride.

Examples of suitable polypropylene-based resins include homopolypropylene, random polypropylene, and block polypropylene.

Examples of suitable polyester resins include polyethylene terephthalate, polybutylene terephthalate, polylactic acid, and polycaprolactone.

Examples of suitable polyamide resin include polyamide 6, polyamide 6.6, polyamide 6.10, polyamide 11, polyamide 12, polyamide 6.12, polyhexamethylenediamine terephthalamide, polyhexamethylenediamine isophthalamide, and polyamide containing xylene groups.

The content of the thermoplastic resin component (B) is from about 3, or from about 5, or from about 10, to about 24, or to about 20, or to about 18, parts by mass, based on 100 parts by mass of the hydrogenated block copolymer component (A), the thermoplastic resin component (B), the rubber softener component (C), and the polyolefin elastomer component (D). If the content of the thermoplastic resin component (B) is less than about 3 parts by mass, the tear strength may be lowered, and if it exceeds about 24 parts by mass, the stress relaxation property may be lowered.

Rubber Softener Component (C)

Examples of suitable rubber softeners for use as the rubber softener component (C) include mineral oils such as paraffinic process oils and naphthenic process oils; vegetable oils such as peanut oil and rosin; phosphoric acid esters; low molecular weight polyethylene glycols; liquid paraffins; low molecular weight ethylene, ethylene-α-olefin copolymerized oligomers; liquid polybutenes; liquid polyisoprene or its hydrogenated materials; and synthetic oils such as liquid polybutadiene or its hydrogenated materials. These may be used alone or in combination of two or more.

Among them, paraffinic oils such as paraffinic process oils and liquid paraffins are suitably used. The paraffinic oil preferably has a kinematic viscosity at 40° C. of from about 20, or from about 50, to about 1,500, or to about 1000, or to about 500, mm$^2$ per second.

The content of the rubber softener component (C) is from about 3, or from about 5, or from about 8, or from about 10, to about 25, or to about 20, or to about 18, or to about 15, parts by mass based on 100 parts by mass of the hydrogenated block copolymer component (A), the thermoplastic resin component (B), the rubber softener component (C), and the polyolefin elastomer component (D). If the content of the rubber softener (C) is less than about 3 parts by mass, the formability may be lowered, and if it exceeds about 25 parts by mass, the tensile strength may be lowered.

Polyolefin Elastomer Component (D)

Examples polyolefin elastomers suitable for use in polyolefin elastomer component (D) include polymers predominantly derived from one or more α-olefin monomers, such as a polyethylene elastomer, a polypropylene elastomer, and the like.

Here, the polyethylene elastomer refers to an elastomer containing a predominant amount of ethylene (by mass), and the polypropylene elastomer refers to an elastomer containing a predominant of propylene (by mass). Among them, from the viewpoints of processability and heat resistance, it is preferable to use a polypropylene elastomer.

Examples of structural units derived from other than ethylene included in polyethylene elastomers include structural units derived from propylene, structural units derived from α-olefins such as 1-butene, 1-hexene, 1-heptene, 1-octene, 4-methyl-1-pentene, 1-nonene, and 1-decene. Among them, an ethylene/propylene random copolymer and an ethylene/butene random copolymer are preferable from the viewpoints of processability and tear strength.

Examples of structural units derived from other than propylene included in polypropylene elastomers include structural units derived from ethylene, structural units derived from α-olefins such as 1-butene, 1-hexene, 1-heptene, 1-octene, 4-methyl-1-pentene, 1-nonene and 1-decene.

Polypropylene-based elastomers include, for example, homopolypropylene, propylene/ethylene random copolymers, propylene/ethylene block copolymers, propylene/butene random copolymers, propylene/ethylene/butene random copolymers, propylene/pentene random copolymers, propylene/hexene random copolymers, propylene/octene random copolymers, propylene/ethylene/pentene random copolymers, propylene/ethylene/hexene random copolymers, etc. Among them, from the viewpoints of processability and heat resistance, propylene/ethylene random copolymers and propylene/butene random copolymers are preferable, and from the viewpoints of tear strength, a propylene/ethylene random copolymer is further preferred.

The content of structural units derived from propylene in the polypropylene elastomer is preferably greater than about 50%, or from about 70%, or from about 75%, or from about 80%, to about 99%, or to about 98%, or to about 95%, or to about 90%, by mass (based on the total mass of the polypropylene elastomer) from the viewpoints of tear strength and heat resistance.

From the viewpoints of tear strength and stress relaxation, when the polypropylene elastomer contains structural units derived from ethylene, the content thereof is preferably from about 1% by mass, or from about 2% by mass, or from about 5% by mass, or from about 10%, to about 50% by mass, or to about 30% by mass, or to about 25% by mass, or to about 20% by mass, based on the total mass of the polypropylene elastomer.

In particular, when the polyolefin elastomer contains a polypropylene elastomer containing structural unit derived from ethylene and the content of the structural unit derived from the ethylene is preferably from about 13.0% by mass, or from about 14.5% by mass, to about 15.9% by mass, or to about 14.8% by mass, based on the total mass of the polypropylene elastomer, the balance of flexibility is improved in addition to the improvement of the tear strength at 32° C., and the tear strength at 38° C.

The polypropylene-based elastomers preferably have a melt flow rate (MFR) of from about 1 g/10 min, or from about 1.5 g/10 min, or from about 2 g/10 min, to about 300 g/10 min, or to about 100 g/10 min, or to about 50 g/10 min, measured according to ASTM D1238 at 230° C. and a load of 2.16 Kg. When the MFR of the polypropylene elastomer is within the above range, the polypropylene elastomer can be formed into a film sheet or the like at high speed.

The densities of the polypropylene-based elastomers are preferably in the range of from about 0.850 g/cm$^3$, or from about 0.855 g/cm$^3$, or from about 0.860 g/cm$^3$, to about 0.910 g/cm$^3$, or to about 0.890 g/cm$^3$, or to about 0.880 g/cm$^3$. When the density of the polypropylene-based elastomer is about 0.850 g/cm$^3$ or more, the tear strength is excellent, and when the density is about 0.910 g/cm$^3$ or less, the stress relaxation property is excellent.

The densities of the polypropylene-based elastomers can be measured in accordance with the ASTM D1505.

The Vicat softening point of the polypropylene elastomer is preferably from about 40° C., or from about 45° C., or from about 50° C., to about 100° C., or to about 80° C., or to about 70° C. When the Vicat softening point of the polypropylene elastomer is about 40° C. or more, the heat resistance is excellent, and when it is about 100° C. or less, the stress relaxation property is excellent.

The Vicat softening point of the polypropylene-based elastomers can be measured according to the ASTM D1525.

The weight average molecular weight (Mw) of the polypropylene elastomer is preferably from about 40,000, or from about 100,000, or from about 200,000, to about 500,000, or to about 400,000, or to about 350,000. When the weight average molecular weight of the polypropylene elastomer is about 40,000 or more, the mechanical properties are excellent, and when it is about 500,000 or less, the moldability is excellent.

Polyolefin elastomers are generally known and commercially available, such as Vistamaxx™ 6102, 6202, 3020FL, 3980FL and 3588FL (Exxon Mobil Corporation).

The content of the polyolefin elastomer component (D) is from about 5, or from about 8, or from about 10, or from about 20, to about 76, or to about 70, or to about 60, or to about 55, parts by mass based on 100 parts by mass of the hydrogenated block copolymer component (A), the thermoplastic resin component (B), the rubber softener component (C), and the polyolefin elastomer component (D). If the content of the polyolefin elastomer component (D) is less than about 5 parts by mass, the anisotropy may deteriorate (increase), and if it exceeds about 76 parts by mass, the elastic recovery property, the tear strength, and the stress relaxation property may deteriorate.

Further, when the content of the polyolefin elastomer is preferably in the range of from about 55% by mass, to about 70% by mass, or to about 65% by mass, based on the total amount of the thermoplastic elastomer composition, the tear strength at 32° C., and the tear strength at 38° C., can be improved.

Hydrogenated Block Copolymer (E)

The thermoplastic elastomer composition of the present invention preferably further contains a hydrogenated block copolymer component (E) from the standpoint of reducing anisotropy.

A hydrogenated block copolymer that is suitable for hydrogenated block copolymer (E) is formed by hydrogenating a block copolymer having a polymer block (x) containing more than about 70% by mass of structural units derived from an aromatic vinyl compound (based on the total mass of polymer block (x)), and a polymer block (y) containing about 30% by mass or more of structural units derived from at least one kind selected from the group consisting of a conjugated diene compound and isobutylene (based on the total mass of polymer block (y)).

One type of hydrogenated block copolymer may be used alone or two or more types of hydrogenated block copolymers may be used in combination.

The polymer block (x) in the hydrogenated block copolymer contains more than about 70% by mass of structural units derived from an aromatic vinyl compound. When the content of the structural unit derived from the aromatic vinyl compound is less than about 70% by mass, the tensile strength and stress relaxation property may be lowered. From this viewpoint, the content of the structural unit derived from the aromatic vinyl compound is preferably about 80% by mass or more, or about 85% by mass or more, or about 90% by mass or more, or about 95% by mass or more, or substantially 100% by mass.

The aromatic vinyl compound mentioned above may be exemplified by the same aromatic vinyl compounds as used for the hydrogenated block copolymer of the hydrogenated block copolymer component (A). Among these, styrene, α-methylstyrene, p-methylstyrene, and mixtures thereof are preferable from the viewpoint of tensile strength, and styrene is more preferable.

The polymer block (x) may contain structural units derived from polymerizable monomers other than aromatic vinyl compounds in a proportion of about 30% by mass or less, or about 20% by mass or less, or about 10% by mass or less, or about 5% by mass or less, or substantially 0% by mass (not present), as long as the object and effect of the present invention are not hindered. Examples of the structural units derived from the other polymerizable monomers include the same structural units derived from the other polymerizable monomers listed as used for the hydrogenated block copolymer of hydrogenated block copolymer component (A).

When the polymer block (x) contains a structural unit derived from the other polymerizable monomer, the bonding form is not particularly limited, and may be random or tapered.

The hydrogenated block copolymer may have at least one of the polymer blocks (x). When the hydrogenated block copolymer has two or more polymer blocks (x), the polymer blocks (x) may be the same or different. In this specification, the term "different polymer blocks" means that at least one of the monomer units constituting the polymer block, the weight average molecular weight, the stereoregularity, and the ratio of each monomer unit and the form of copolymerization (random, gradient, block) when having a plurality of monomer units is different.

The content of the polymer block (x) in the hydrogenated block copolymer (E) (when a plurality of polymer blocks (x) are included, the total content thereof) is from about 4% by mass, or from about 8% by mass, or from about 10% by mass, or from about 11% by mass, to about 30% by mass, or to about 25% by mass, or to about 20% by mass, or to about 15% by mass. If the content of the polymer block (x) is less than about 4% by mass, the processability may be deteriorated, and if it is more than about 30% by mass, the stress relaxation property and anisotropy may be deteriorated.

The content of the polymer block (x) in the hydrogenated block copolymer (E) is a value obtained by a H-NMR spectrum after hydrogenation, and more specifically, is a value measured according to the methods described in the Examples.

The polymer block (y) in the hydrogenated block copolymer (E) contains about 30% by mass or more of structural units derived from at least one member selected from the group consisting of a conjugated diene compound and isobutylene. If the content of the structural unit derived from at least one member selected from the group consisting of a conjugated diene compound and isobutylene is less than about 30% by mass, the tensile strength may be lowered. From this viewpoint, the content of the structural unit derived from at least one member selected from the group consisting of the conjugated diene compound and isobutylene is preferably about 50% by mass or more, or about 65% by mass or more, or about 80% by mass or more.

The polymer block (y) in the hydrogenated block copolymer (E) may contain about 30% by mass or more of the structural units derived from the conjugated diene compound, 30% by mass or more of the structural units derived from the isobutylene, or 30% by mass or more of the structural units derived from the mixture of the conjugated diene compound and isobutylene. The polymer block (y) may have only a structural unit derived from one conjugated diene compound or may have a structural unit derived from two or more conjugated diene compounds.

When the polymer blocks (y) have two or more structural units, their bonding forms can consist of random, tapered, fully alternating, partially blocked, blocks, or a combination of two or more thereof.

Examples of the conjugated diene compound include isoprene, butadiene, hexadiene, 2,3-dimethyl-1,3-butadiene, 1,3-pentadiene, farnesene, myrcene and mixtures. Among these, isoprene, butadiene, and a mixture of isoprene and butadiene are preferable, and any of these may be used, and among these, isoprene is more preferable. In the case of a mixture of butadiene and isoprene, the mixing ratio {isoprene/butadiene} (mass ratio) is not particularly limited, but is preferably from about 5/95, or from about 10/90, or from about 40/60, or from about 45/55, to about 95/5, or to about 90/10, or to about 70/30, or to about 65/35, or to about 55/45. The mixing ratio {isoprene/butadiene} is preferably from about 5/95, or from about 10/90, or from about 40/60, or from about 45/55, to about 95/5, or to about 90/10, or to about 70/30, or to about 55/45, in terms of molar ratio.

When the structural unit constituting the polymer block (y) in the hydrogenated block copolymer is any one of a structural unit derived from isoprene, a structural unit derived from butadiene, and a structural unit derived from a mixture of isoprene and butadiene, the hydrogenated block copolymer can contain a 1,2-bond and/or a 3,4-bond in the case of butadiene, and 1,2-bond, 3,4-bond and/or 1,4-bond in the case of isoprene, respectively.

In the hydrogenated block copolymer, the total content of 3,4-bond units and 1,2-bond units (hereinafter, sometimes referred to as vinyl bond amount) in the polymer block (y) is preferably about 20 mol % or more, or about 40 mol % or more, or about 50 mol % or more. Although not particularly limited, the amount of vinyl bond in the polymer block (y) is preferably about 90 mol % or less, or about 85 mol % or less. Here, the vinyl bond is the value calculated by measuring the H-NMR according to the method described in the examples.

When the polymer block (y) is composed only of butadiene, the term "content of 3,4-bond units and 1,2-bond units" is used instead of "content of 1,2-bond units".

The polymer block (y) in the hydrogenated block copolymer may contain structural units derived from other polymerizable monomers other than conjugated diene compounds and isobutylene, as long as they do not interfere with the object and effect of the present invention. In this case, in the polymer block (y), the content of structural units derived from other polymerizable monomers other than the conjugated diene compound and the isobutylene is preferably less than about 70% by mass, or less than about 50% by mass, or less than about 35% by mass, or less than about 20% by mass, or less than about 15% by mass, and 5% by mass or greater.

The other polymerizable monomers preferably include aromatic vinyl compounds such as styrene, α-methylstyrene, o-methylstyrene, m-methylstyrene, p-methyl styrene, p-t-butylstyrene, 2,4-dimethylstyrene, vinylnaphthalene and vinylanthracene, and at least one compound selected from the group consisting of methyl methacrylate, methyl vinyl ether, N-vinylcarbazole, β-pinene, p-menthane-8,9-diol, dipentene, methylenolbornene, 2-methylenetetrahydrofuran, 1,3-cyclopentadiene, 1,3-cyclohexadiene, 1,3-cycloheptadiene and the like. Among these, styrene, α-methylstyrene, and p-methylstyrene are preferable, and styrene is more preferable.

When the polymer block (y) contains structural units derived from conjugated diene compounds and other polymerizable monomers other than isobutylene, specific combinations thereof are preferably isoprene and styrene, butadiene and styrene, a mixture of isoprene and butadiene and styrene, and more preferably isoprene and styrene, and a mixture of isoprene and butadiene and styrene.

When the polymer block (y) contains a structural unit derived from a polymerizable monomer other than a conjugated diene compound and isobutylene, its binding form is not particularly limited, and may be random or tapered.

The hydrogenated block copolymer may have at least one of the polymer blocks (y). When the hydrogenated block copolymer has two or more polymer blocks (y), the polymer blocks (y) may be the same or different.

The mode of bonding between the polymer block (x) and the polymer block (y) in the hydrogenated block copolymer may be any of linear, branched, radial, or any combination thereof. Among these, it is preferable that the mode of bonding between the polymer block (x) and the polymer block (y) is linear, and examples thereof include diblock copolymer indicated by "P-Q" when the polymer block (x) is denoted by "P" and the polymer block (y) is denoted by "Q", triblock copolymer indicated by "P-Q-P", tetrablock copolymer indicated by "P-Q-P-Q", pentablock copolymer indicated by "P-Q-P-Q-P" and "Q-P-Q-P-Q", and (P-Q)nX type copolymer (X represents a residue of a coupling agent and n represents an integer of 3 or more). Among them, a linear triblock copolymer or a diblock copolymer is preferable, and a P-Q-P type triblock copolymer is preferably used from the viewpoint of processability.

The polymer block (y) in the hydrogenated block copolymer (E) is hydrogenated preferably at least about 80 mol %, or at least about 85 mol %, or at least about 88 mol %, of carbon-carbon double bonds in the structural unit derived from the conjugated diene compound and isobutylene from the viewpoint of tensile strength. There is no particular limitation on the upper limit value of the hydrogenation rate, but the upper limit value may be about 99 mol %, or about 98 mol %.

On the other hand, when crosslinking or foaming is considered, the hydrogenation rate may be about 50 mol % or less, or about 10 mol % or less, or about 5 mol % or less, or about 3 mol % or less.

The hydrogen addition rate mentioned above is the value calculated by measuring the content of carbon-carbon double bonds in the structural units derived from the cooperating diene compounds and isobutylene in the polymer blocks (y) using the H-NMR spectrum before and after hydrogen addition, from the measured value. More specifically, it is the value measured in accordance with the methods described in the examples.

The glass transition temperature (Tg) of the hydrogenated block copolymer is from about −45° C. to about 30° C. When the glass transition temperature of the hydrogenated block copolymer (E) is less than about −45° C., anisotropy may deteriorate, and when it exceeds about 30° C., stress relaxation may deteriorate. From this viewpoint, the glass transition temperature of the hydrogenated block copolymer (E) is preferably from about −40° to about 10° C., or to about 0° C.

The above-mentioned glass-transition temperatures can be measured according to JIS K7121:2012, and in particular, can be measured by the methods described in the examples.

The weight average molecular weight (Mw) of the hydrogenated block copolymer is preferably from about 20,000, or from about 50,000, or from about 70,000, or from about 90,000, or from about 130,000, to about 800,000, or to about 700,000, or to about 600,000, or to about 500,000, or to about 450,000. When the weight average molecular weight of the hydrogenated block copolymer is about 20,000 or more, the tensile strength is excellent, and when it is about 800,000 or less, the molding workability is excellent.

The molecular weight distribution (Mw/Mn) of the hydrogenated block copolymer is preferably about 1.5 or less, or about 1.4 or less, or about 1.3 or less, or about 1.2 or less, to about 1.0.

Note that the hydrogenated block copolymer (E) may have one or more functional groups such as a carboxyl group, a hydroxyl group, an acid anhydride group, an amino group, and an epoxy group in the molecular chain and/or at the molecular end as long as the effect of the present invention is not significantly impaired.

Method for Producing Hydrogenated Block Copolymer (E)

The hydrogenated block copolymer (E) can be produced by a solution polymerization method, an emulsion polymerization method, a solid state polymerization method, or the like. Among them, a solution polymerization method is preferable, and for example, a known method such as an ionic polymerization method such as anionic polymerization or cationic polymerization, or a radical polymerization method can be applied. Among them, an anionic polymerization method is preferable. A production method by the anionic polymerization method is as described above in the section of the production method of the hydrogenated block copolymer of hydrogenated block copolymer component (A).

The content of the hydrogenated block copolymer component (E) is preferably from about 3, or from about 4, or from about 5, to about 15, or to about 13, or to about 12 parts by mass, based on the total mass of the hydrogenated block copolymer component (A), the thermoplastic resin component (B), the rubber softener component (C), the polyolefin elastomer component (D) and the hydrogenated block copolymer component (E). When the content of the hydrogenated block copolymer (E) is about 3 parts by mass or more, the anisotropy is reduced, and when it is about 15 parts by mass or less, the tensile strength is excellent.

Other Optional Components

In the thermoplastic elastomer composition of the present invention, in addition to the above-mentioned components, other components can be blended according to the purpose within a range not significantly impairing the effect of the present invention.

The other components include, for example, fillers, antioxidants, thermal stabilizers, light stabilizers, ultraviolet absorbers, neutralizing agents, lubricants, antifoggants, antiblocking agents, tackifiers, colorants, flame retardants, antistatic agents, cross-linking agents, conductivity imparting agents, antimicrobial agents, various additives such as antifungal agents, thermoplastic resins other than the above components, elastomers other than the above essential components, and the like. Any one of these may be used alone, or two or more types may be used in combination.

The total content of the hydrogenated block copolymer (A), the thermoplastic resin (B), the rubber softener (C), and the polyolefin elastomer (D) in the thermoplastic elastomer composition of the present invention is preferably about 80% by mass or more, or about 85% by mass or more, or about 90% by mass or more, based on the total mass of the thermoplastic elastomer composition.

The thermoplastic elastomer composition of the present invention can be prepared by mixing the above hydrogenated block copolymer (A), thermoplastic resin (B), rubber softener (C), polyolefin elastomer (D), and optionally blended hydrogenated block copolymer (E), and other optional ingredients. As a mixing method, a method conventionally used can be employed, and for example, after uniformly mixing using a mixing device such as a high-speed mixer, a ribbon blender, or a V-type blender, melt kneading may be performed using a kneading device such as a mixing roll, a kneader, a Banbury mixer, a Brabender mixer, or a single-screw or twin-screw extruder. The kneading is generally carried out at a temperature of from about 120° C. to about 280° C.

Sea-Island Structure

From the viewpoint of reducing anisotropy, the thermoplastic elastomer composition of the present invention preferably has a resin component sea-island structure of the polyolefin elastomer component (D) and components other than the polyolefin elastomer component (D). Here, the sea-island structure means a phase separation structure in which an island phase exists in the sea phase. The polyolefin elastomer component (D) may be an island phase, a component other than the polyolefin elastomer component (D) may be a sea phase, the polyolefin elastomer component (D) may be a sea phase, and a component other than the polyolefin elastomer component (D) may be an island phase, but from the standpoint of reducing anisotropy, it is preferable that the polyolefin elastomer component (D) is a sea phase, and a component other than the polyolefin elastomer component (D) is an island phase, and from the standpoint of improving the tear strength and stress relaxation property, it is preferable that the polyolefin elastomer component (D) is an island phase, and a component other than the polyolefin elastomer component (D) is a sea phase. Further, from the viewpoint of tear strength, it is preferable that the polyolefin elastomer component (D) and components other than the polyolefin elastomer component (D) are finely dispersed in the thermoplastic elastomer composition.

It is preferable that the thermoplastic elastomer composition of the present invention is not a co-continuous structure from the viewpoint of reducing anisotropy. Here, the co-continuous structure means a network structure in which two components or two or more components are mixed with each other while forming a continuous phase.

The morphology (phase structure) of the polyolefin elastomer component (D) and the components other than the polyolefin elastomer component (D) can be appropriately adjusted by the content of the polyolefin elastomer component (D) in the thermoplastic elastomer composition and the molding process (temperature, speed).

Here, it has been found that when the content of the polyolefin elastomer component (D) in the thermoplastic elastomer composition is from about 30% by mass to about 45% by mass, the thermoplastic elastomer composition tends to have a co-continuous structure, and the tear strength tends to be lowered. In addition, it has been found that when the content of the polyolefin elastomer component (D) is within the above range, a polystyrene-based resin is used as the thermoplastic resin, or the thermoplastic elastomer composition further contains the hydrogenated block copolymer component (E), the thermoplastic elastomer composition hardly assumes a co-continuous structure, and the tear strength tends to be improved.

The sea island structure can be confirmed by the following method.

A cross-sectional image of the thermoplastic elastomer composition (film) is taken using a transmission electron microscope (TEM) JEM-2100F (manufactured by JEOL, Ltd.), and the morphology of the cross-section of the thermoplastic elastomer composition (film) is observed from the obtained cross-sectional image. The sheet-shaped thermoplastic elastomer composition is cut to an appropriate size, embedded in a thermosetting epoxy resin, and sliced to a thickness of 80 nm in a frozen state using a cryo ultramicrotome EM UC7/FC7 (manufactured by Leica Microsystems, Inc.) to prepare an ultra-thin section, which is used as an observed sample. The sample is subjected to electron staining and microscopic observation by gas phase staining at room temperature (23° C.) using ruthenium tetroxide. Observation is performed at 23° C. under ultra-high vacuum, in the range of observation magnification of 2000×, observation field of 10.6 µm×10.6 µm, and observation magnification of 5000×, observation field of 4.25 µm×4.25 µm.

Whether the structure is a sea island structure or a co-continuous structure is confirmed in an image of a cross section of a film photographed using a TEM at an observation magnification of 2000 times and a photographing size in a range of an observation field of 10.6 µm×10.6 µm, and a structure in which 90% of the separated structure in the image reaches both ends of the image is defined as a co-continuous structure. Whether the island structure is a fine dispersion is not a co-continuous structure according to the above standard, but an image of a cross section of a film photographed by a TEM is confirmed by a photographing size in a range of an observation magnification of 5000 times and an observation field of 4.25 µm×4.25 µm, and an image of a typical 2 µm square in which the length of the island in the long axis direction is measured from an image using DigitalMicrograph software (Gatan Inc.), and a length of the island having a mean of 1.5 µm or less is defined as a fine dispersion.

The island phase constituting the sea island structure preferably has a long axis of about 100 nm or more, or about 150 nm or more, or about 200 nm or more, and preferably about 5 µm or less, or about 3 µm or less, or about 1.5 µm or less. When the long axis of the island phase is about 100 nm or more and about 5 µm or less, the tear strength is improved.

The long axis of the above-mentioned island phase can be confirmed in an image of a cross section of a film photographed by TEM at an observation magnification of 5000 times and an observation field of view of 4.25 µm×4.25 µm, and the length of the long axis direction of the island can be measured from an image in a typical 2 µm square by DigitalMicrograph software (Gatan Inc.).

The island phase constituting the sea island structure has an aspect ratio (long axis/short axis) of preferably about 3 or less, or about 2.5 or less, or about 2 or less, from the viewpoint of reducing anisotropy. The lower limit of the aspect ratio is preferably about 1.

When the polyolefin elastomer component (D) is an island phase, from the viewpoint of reducing anisotropy, the area proportion of the island phase in the sea-island structure is preferably from about 10%, or from about 20%, or from about 30%, to about 80%, or to about 70%, or to about 60%.

When the polyolefin elastomer component (D) is a sea phase, the area proportion of the sea phase in the sea island structure is preferably from about 10%, or from about 20%, or from about 30%, to about 80%, or to about 70%, or to about 60%, from the viewpoint of good tear strength and stress relaxation.

The ratio of the sea phase and the ratio of the island phase in the above-mentioned sea-island structure can be measured by the area ratio of the sea phase and the island phase in an image of a cross section of a film photographed using a TEM, which is confirmed at an observation magnification of 2000 times and a photographing size in a range of an observation field of 10.6 µm×10.6 µm.

The tear strength of the thermoplastic elastomer composition of the present invention in the Elmendorf (MD) test is preferably not less than about 300N, or not less than about 500N.

The stress relaxation property (long term) of the thermoplastic elastomer composition of the present invention is preferably about 60% or more, or about 65% or more.

The tear strength and the stress relaxation property (long term) in the above-mentioned Elmendorff (MD) test can be measured by the method described in the examples.

The stress relaxation property of the thermoplastic elastomer composition of the present invention in the tensile test is preferably about 27% or less, or about 25% or less.

The stress relaxation property in anisotropy of the thermoplastic elastomer composition of the present invention is preferably about 2.0 times or less, or about 1.8 times or less.

The stress relaxation property in the tensile test and the stress relaxation property in the anisotropy can be measured by the method described in the examples.

Uses of Thermoplastic Elastomer Compositions

Since the thermoplastic elastomer composition of the present invention has good elastic recovery, tear strength at 25° C., and stress relaxation, and can reduce anisotropy, the thermoplastic elastomer composition can be suitably used in film and sheet applications for everyday products such as hygiene and personal care material members, diapers, industrial products, household appliances, food containers, packaging materials, medical products such as bandages, general merchandise, stretchable films such as sports products, sheets, and the like.

Also, in some applications, tear strength at 32° C. and/or tear strength at 38° C. is required. Applications requiring tear strength at 32° C. include swimming wear elastic parts, swimming products such as goggles, industrial bungee cords, fishing lures, sports grip products such as tennis, elastomeric films such as disposable rubber gloves used in cold districts and freezers, and exercise rubber bands.

As a means for improving the tear strength at 32° C., for example, a hydrogenated block copolymer in which a polymer block (b) in a hydrogenated block copolymer (A) contains only a structural unit derived from 1,3-butadiene is used; when a hydrogenated petroleum resin is used as the thermoplastic resin (B), there may be mentioned a method such as appropriately adjusting a blending amount of the hydrogenated petroleum resin and the oil {rubber softener (C)}; appropriately adjusting a content of the polyolefin elastomer (D); appropriately adjusting a content of the structural unit derived from ethylene contained in the polyolefin elastomer (D), and the like.

Applications for which tear strength at 38° C. is required include elastic parts of clothing (underwear, lingerie, body correction clothing, elastic parts such as sports clothing, grip parts), daily necessities such as hygiene materials, condoms, adult toys, sports vantages, medical bandages, wound care, medical tourniquets, and medical aids such as back pain relief.

Examples of the means for improving the tear strength at 38° C. include a method of appropriately adjusting the content of the polyolefin elastomer (D), appropriately adjusting the content of the structural unit derived from ethylene contained in the polyolefin elastomer (D), and the like.

EXAMPLES

Examples and comparative examples are shown below to more specifically explain the present invention. The present invention is not limited by the following examples.

In the following Examples and Comparative Examples, the physical properties of the hydrogenated block copolymers components (A) and (E), and the thermoplastic elastomer compositions were evaluated by the following methods.

Method of Measurement of Crystallization Peak Temperature and Glass Transition Temperature Differential scanning calorimetry (DSC) was used to determine the crystallization peak temperature from the exothermic peak observed in the temperature-lowering process of the following 2nd step, and the glass transition temperature from the endothermic peak observed in the temperature-raising process of the following 3rd step.

Equipment: DSC6200 (manufactured by Seiko Instruments, Inc.)
Temperature rise rate: 10° C./min
Temperature reduction rate: 10° C./min
Nitrogen flow: 40 mL/min
Temperature profile
1st: 30° C.→150° C. (held for 5 minutes)
2nd: 150° C.→−100° C. (held for 5 minutes)
3rd: −100° C.→150° C.

Hydrogenation Rate, Styrene Content, Amount of 1,4-Bond in Polymer Block (b), and Weight Ratio of Structural Units Derived from Isoprene to Structural Units Derived from Butadiene, and Methods for Measuring the Amount of Vinyl Bond in Polymer Block (y)

Both were obtained from the $^1$H spectrum of H-NMR. The amount of 1,4-bond in the polymer block (b) was measured using the block copolymer before hydrogenation, and the ratio of the peak area of 1,4-bond to the sum of the peak areas of 1,2-bond and 3,4-bond and the peak area of 1,4-bond was calculated. The amount of vinyl bond in the polymer block (y) was measured using the block copolymer before hydrogenation, and the ratio of the peak areas of 1,2-bond and 3,4-bond to the sum of the peak areas of 1,2-bond and 3,4-bond was calculated. Further, the mass ratio of the structural unit derived from isoprene and the structural unit derived from butadiene was measured using a block copolymer before hydrogenation.

Equipment: JNM-Lambda 500 (manufactured by JEOL Ltd.)
Solvent: deuterated chloroform
Measured temperature: 50° C.

Methods for Determining Weight-Average Molecular Weight (Mw), Molecular Weight Distributions (Mw/Mn)

The weight-average molecular weight (Mw) and molecular weight distributions (Mw/Mn) were determined by gel permeation chromatography (GPC) in terms of standard polystyrenes.

Equipment: GPC-8020 (manufactured by Tosoh Corporation)
Solvent: tetrahydrofuran
Measured temperature: 40° C.
Flow rate: 1 mL/min
Injection volume: 150 concentration: 5 mg/10 cc (hydrogenated block copolymer/THF)

Morphology

With respect to the thermoplastic elastomer composition (film) obtained in Examples 3, 5, 6 and 8, a cross-sectional image of the thermoplastic elastomer composition (film) was photographed using transmission electron microscopy (TEM) JEM-2100F (manufactured by JEOL Ltd.), and the morphology of the cross-section of the film was observed from the obtained cross-sectional image. The thermoplastic elastomer composition formed into a sheet was cut into a suitable size, embedded in a thermosetting epoxy resin, and then sliced to a thickness of 80 nm in a frozen state using a cryo ultra microtome EM UC7/FC7 (manufactured by Leica Microsystems, Inc.) to prepare an ultra-thin section, which was used as an observed sample. The samples were subjected to electron staining and microscopic observation by gas phase staining at room temperature (23° C.) using ruthenium tetroxide. Observations were performed at 23° C. under ultra-high vacuum, in the range of observation magnification 2000×, observation field of 10.6 μm×10.6 μm, and observation magnification of 5000×, observation field of 4.25 μm×4.25 μm.

FIGS. 1 to 8 are morphology images obtained by cutting and observing cross-sectional images of a thermoplastic elastomer composition (film) along the machine direction (MD) at the time of manufacturing the film using a transmission electron microscope.

In FIGS. 1 to 8, the light regions correspond to the polyolefin elastomer component (D), and the dark regions correspond to resin components other than the polyolefin elastomer component (D). Dark areas are dyed with structures having double bonds, specifically hydrogenated block copolymer component (A), hydrogenated block copolymer component (E), Styrolution PS3190 and Kristalex™ 5140. The morphology was measured and evaluated by using the length of the long axis and the short axis direction of the island phase in the respective photographing sizes, which were analyzed by DigitalMicrograph software (Gatan Inc.), in accordance with an evaluation standard described later.

Tear Resistance (Slow)

(1) Tear Resistance at 25° C.

Sheet-shaped thermoplastic elastomeric compositions (TD-direction) were cut to 50.8 mm×25.4 mm sizes according to ASTM D882 using a die to prepare test pieces (6 pieces). The thickness of each specimen was measured and recorded in mils. The center of each specimen was then marked and a 2 mm incision was made in the end of the specimen. The test piece was inserted into a pneumatic film grip (½ inch pad with 1 inch line grip) from Instron 5567 (Instron) with Bluehill 3 software and a 100N load cell, the measured temperature was set to 25° C., and then the test piece was stretched to 175% elongation with a crosshead at 250 mm/min and held for 1 hour as long as the test piece did not tear or break. After holding for 1 hour, the number of specimens that did not tear in two is the result of tear resistance at 25° C. A positive result is considered if 2 or more test pieces did not break into two shall.

(2) Tear Resistance at 32° C.

A test piece (2 pieces) was produced in the same manner as in the test of the tear resistance at 25° C. The test piece was inserted into a pneumatic film grip (½ inch pad with 1 inch line grip) from Instron 5567 (Instron) with Bluehill 3 software and a 100N load cell, the measured temperature was set to 32° C., and then the test piece was stretched to 150% elongation with a crosshead at 250 mm/min and held for 10 hour as long as the test piece did not tear or break. After 10 hours holding, the time taken to tear the test piece to two pull was measured, and the average value as a result of tear resistance at 32° C.

(3) Tear Resistance at 38° C.

In the test of the tear resistance at 32° C., the tear resistance at 38° C. was measured in the same manner as in (2) above, except that the measurement temperature was changed to 38° C.

Elmendorf (MD) Test

The following tests were performed in accordance with the ASTM D1922.

Sheeted thermoplastic elastomeric compositions (MD-direction) were prepared in slitted specimens (10 pieces) according to ASTM D1922 using a die. The thickness (μm) of each test piece was measured to obtain the mass (g) of each test piece. The study piece was fixed to the test site of Elmendorf Tearing Tester (Thwing-Albert), the pendulum was inserted by pressing the test buttons, the test piece was torn using a 1600 g weight, and the results obtained were recorded in gf. As a result of the test, the number of the test pieces that were not torn was described, and the average value of the tear strength was calculated for the test pieces that were torn, and the value was described.

Stress Relaxation (Long-Term)

Sheet-shaped thermoplastic elastomeric compositions (TD-direction) were cut into 50.8 mm×25.4 mm sizes according to ASTM D882 using a die to prepare test pieces. The thickness of the specimens was measured and recorded in mils. The test piece was used to carry out the test according to the procedures described below with Bluehill 3 software and Instron 5567 (Instron) equipped with a 100N load cell, and the stress-relaxation property was calculated by the following equation.

(1) The Instron 5567 was loaded with specimens which were stretched to 500% elongation at 250 mm/min and returned to 0% elongation.

(2) The bottom film grip was released to allow the specimen to relax for 30 seconds and the bottom film grip closed again.

(3) The specimens were stretched to 50% elongation at 250 mm/min and held for 10 hours.

Stress relaxation (%)=Tensile strength at 50% elongation and held for 10 hours (MPa)/Tensile strength immediately after 50% elongation (MPa)×100

Tensile Test (TD)

Sheet-shaped thermoplastic elastomeric compositions (TD-direction) were cut to 50.8 mm×25.4 mm sizes according to ASTM D882 using a die to prepare test pieces (6 pieces). The center thickness in inches of each specimen was measured. The test piece was inserted into a pneumatic grip of Instron 5567 (Instron) equipped with Bluehill 3 software and a 100N load cell, the test piece was extended at 250 mm/min until it reached 200% elongation with a crosshead, held at 200% elongation for 30 seconds, and then returned to 0% elongation for 60 seconds, and the stress-relaxation property was calculated by the following equation. Note that the 100N load cell is used with a pneumatic film grip, which has a 12.7 mm×25.4 mm grip on one side and a 25.4 mm line grip on the opposite side.

Stress relaxation (%)=Tensile strength immediately after 200% elongation (MPa)—Tensile strength immediately after 200% elongation and held for 30 seconds (MPa)/Tensile strength immediately after 200% elongation (MPa)×100

Anisotropy

Sheet-shaped thermoplastic elastomeric compositions (MD-direction) were cut into 50.8 mm×25.4 mm sizes according to ASTM D882 using a die to prepare test pieces (6 pieces). The center thickness in inches of each specimen was measured. The test specimens were tested according to the procedures described for the in the above Tensile Test (TD) using Bluehill 3 software and Instron 5567 (Instron) with a 100N load cell, and the stress-relaxation properties in the MD directions were calculated. The ratio ($F_2/F_1$) between the stress relaxation property ($F_1$) in the TD direction and the stress relaxation property ($F_2$) in the MD direction calculated in the above Tensile Test (TD) was calculated, and this was regarded as the stress relaxation property in the anisotropy.

Preparation Example 1: Preparation of Hydrogenated Block Copolymer (A1)

3,000 mL of cyclohexane as a solvent and 9.2 mL of 10.5% by weight sec-butyllithium (cyclohexane solution) as an initiator were charged into a nitrogen-substituted and dried pressure-resistant vessel, the temperature was raised to 60° C., and then 100 mL of styrene was added thereto to polymerize the solution for 60 minutes.

Thereafter, at the same temperature, 4.3 mL of isoprene and 5.7 mL of butadiene were added simultaneously, and the reaction was repeated by adding the same amount of isoprene and butadiene to each other at a time for 3.8 minutes. Finally, 265 mL of isoprene and 360 mL of butadiene were added, and then the reaction was continued for another 90 minutes.

Further, 100 mL of styrene was added at the same temperature to polymerize for 60 minutes, and then the polymerization was stopped with 0.52 mL of methanol to obtain a reaction solution containing a polystyrene-poly (isoprene/butadiene)-polystyrene triblock copolymer.

To this reaction solution, 29.3 g of palladium carbon (palladium loading: 5% by weight) was added as hydrogenation catalyst, and hydrogenation reaction was carried out 2 MPa hydrogen pressure at 150° C. for 10 hours. After cooling and releasing the pressure, palladium carbon was removed by filtration, the filtrate was concentrated and dried under vacuum to obtain a hydrogenated product of polystyrene-poly(isoprene/butadiene)-polystyrene triblock copolymer (hereinafter referred to as hydrogenated block copolymer (A1)). Physical properties of the obtained hydrogenated block copolymer (A1) were evaluated according to the above method. The results are shown in Table 1.

Preparation Example 1: Preparation of Hydrogenated Block Copolymer (A2)

50 kg of cyclohexane as a solvent and 147 g of sec-butyllithium (10.5% by mass of cyclohexane solution) as an anionic polymerization initiator (equivalent to 15.4 g of sec-butyllithium) were charged, into a nitrogen-substituted and dried pressure-resistant vessel, and 128 g of tetrahydrofuran as a Lewis base was charged. After the temperature was raised to 50° C., 2.42 kg of styrene (1) was added and polymerized for 1 hour, followed by addition of 10.76 kg of butadiene at 40° C. and polymerization for 2 hours, and the temperature was further increased to 50° C., and then 2.42 kg of styrene (2) was added and polymerized for 1 hour to obtain a reaction solution containing a polystyrene-polybutadiene-polystyrene triblock copolymer.

To this reaction solution, palladium carbon (palladium loading: 5% by mass) was added as hydrogenation catalysts to the block copolymer at 5% by mass, and the reaction was carried out 2 MPa hydrogen pressure at 150° C. for 10 hours.

After cooling and releasing to pressure, palladium carbon was removed by filtration, the filtrate was concentrated and further dried under vacuum to obtain a hydrogenated product of a polystyrene-polybutadiene-polystyrene triblock copolymer (hereinafter, referred to as a hydrogenated block copolymer (A2)). Physical properties of the obtained hydrogenated block copolymer (A2), were evaluated according to the above method. The results are shown in Table 1.

Preparation Example 3: Preparation of Hydrogenated Block Copolymer (E)

50 kg of cyclohexane as a solvent and 76 g of sec-butyllithium (10.5% by weight of cyclohexane solution) as an anionic polymerization initiator (equivalent to 8.0 g of sec-butyllithium) were charged into a nitrogen-substituted and dried pressure-resistant vessel, and 310 g of tetrahydrofuran as a Lewis base was charged. After the temperature was raised to 50° C., 0.5 kg of styrene (1) was added and polymerized for 1 hour, followed by addition of a mixed solution of 8.2 kg of isoprene and 6.5 kg of butadiene {isoprene/butadiene (mass ratio)=55/45} at 40° C. and polymerization for 2 hours, followed by addition of 1.5 kg of styrene (2) and polymerization for 1 hour to obtain a reaction solution containing a polystyrene-poly(isoprene/butadiene)-polystyrene triblock copolymer.

To this reaction solution, palladium carbon (palladium loading: 5% by mass) was added as hydrogenation catalysts to the block copolymer at 5% by mass, and the reaction was carried out 2 MPa hydrogen pressure at 150° C. for 10 hours.

After cooling and releasing the pressure, palladium carbon was removed by filtration, the filtrate was concentrated and dried under vacuum to obtain a hydrogenated product of polystyrene-poly(isoprene/butadiene)-polystyrene triblock copolymer (hereinafter referred to as hydrogenated block copolymer (E)). Physical properties of the obtained hydrogenated block copolymer (E) were evaluated according to the above method. The results are shown in Table 1.

TABLE 1

|  | Preparation Example 1 | Preparation Example 2 | Preparation Example 3 |
|---|---|---|---|
| Hydrogenated block co-polymer | (A1) | (A2) | (E) |
| Styrene content (mass %) | 30 | 31.0 | 12 |
| Isoprene/1,3-butadiene (mass ratio) | 45/55 | 0/100 | 55/45 |
| Weight-average molecular weight (Mw) | 97,400 | 99,000 | 160,000 |
| Molecular weight distributions (Mw/Mn) | 1.03 | 1.03 | 1.04 |
| Hydrogenation rate (mol %) | 98.2 | 98.4 | 92 |
| Amount of 1,4-bond (mol %) | 93 | — | — |

TABLE 1-continued

|  | Preparation Example 1 | Preparation Example 2 | Preparation Example 3 |
|---|---|---|---|
| Amount of vinyl bond (mol %) | — | 40 | 60 |
| Crystallization peak temperature (° C.) | 6.7 | 1.9 | — |
| Glass transition temperature (° C.) | −52 | −53 | −32 |

Examples 1 to 32 and Comparative Examples 1 to 5

Films of thermoplastic elastomeric compositions were obtained using a 27 mm Leistritz twin screw extruder equipped with extended mixing sections set to a temperature $T_1$° C., followed by addition and premixing of components of the types and amounts listed in Tables 2A, 2B, 2C and 2D followed by a Thermo Fisher 20 mm single screw machine set to a temperature $T_2$° C. The measurement results of the physical properties of the obtained thermoplastic elastomer composition are shown in Tables 2A, 2B, 2C and 2D.

Details of each of the ingredients listed in Tables 2A, 2B, 2C and 2D used to prepare the thermoplastic elastomer composition are as follows.

Hydrogenated Block Copolymer Component (A):
Hydrogenated block copolymer (A1) (Preparation Example 1)
Hydrogenated block copolymer (A2) (Preparation Example 2)
Thermoplastic Resin Component (B):
Hydrocarbon resin (hydrogenated petroleum resin)—Regalite™ R1125 (Eastman Chemical Company)
Polypropylene—P4C5B-030 (Flint Hills Resources)
High molecular weight polystyrene-based resin—Styrolution PS3190 (INEOS Styrolution America LLC) (Mw—250,000)
Low molecular weight polystyrene-based resin—Kristalex™5140 (Eastman Chemical Company) (Mw—4,900, Mz—9,800, Tg—90° C.)
Low molecular weight polystyrene-based resin—Piccotex™120 (Eastman Chemical Company) (Mw—4,100, Mz—7,200, Tg—70° C.)
Low molecular weight polystyrene-based resins—Piccotex™100 (Eastman Chemical Company) (Mw—2,400, Mz—4,100, Tg—50° C.)
Low molecular weight polystyrene-based resins—Kristalex™3100 (Eastman Chemical Company) (Mw—1,500, Mz—2,500, Tg—51° C.)
Rubber Softener Component (C):
Oil—Krystol™ 550 (Petro-Canada Lubricants LLC) (kinematic viscosity at 40° C.: 105 mm²/s)
Oil—Renoil 1700W (Renkert Oil) (kinematic viscosity at 40° C.: 307.7 mm²/s)
Polyolefin Elastomer Component (D):
Polyolefin elastomer—Vistamaxx™ 6102 (Exxon Mobil Corporation) (structural units derived from ethylene: 16% by mass)
Polyolefin elastomer—Vistamaxx™ 3020FL (Exxon Mobil Corporation) (structural units derived from ethylene: 11% by mass)
Hydrogenated Block Copolymer Component (E)
Hydrogenated block copolymer (E) (Preparation Example 3)

TABLE 2A

| | | Unit | EX1 | EX2 | EX3 | EX4 | EX5 |
|---|---|---|---|---|---|---|---|
| \multicolumn{8}{c}{Thermoplastic elastomer composition} | | | | | | | |
| Hydrogenated block copolymer (A) | Hydrogenated block copolymer (A1) | phr | 54 | 48 | 36 | 30 | 24 |
| | Hydrogenated block copolymer (A2) | phr | | | | | |
| Thermoplastic resin (B) | Regalite ™ R1125 | phr | 9 | 8 | 6 | 5 | 4 |
| | P4C5B-030 | phr | | | | | |
| | Styrolution PS3190 | phr | 9 | 8 | 6 | 5 | 4 |
| | Kristalex ™ 5140 | phr | | | | | |
| | Piccottex ™ 120 | phr | | | | | |
| Rubber softener (C) | Krystol ™ 550 | phr | 18 | 16 | 12 | 10 | 8 |
| | Renoil 1700W | phr | | | | | |
| Polyolefin elastomers (D) | Vistamaxx ™ 6120 | phr | 10 | 20 | 40 | 50 | 60 |
| | Vistamaxx ™ 3020FL | phr | | | | | |
| Hydrogenated block copolymer (E) | | phr | | | | | |
| Temperatures of twin-screw extruder ($T_1$) | | ° C. | 205 | 205 | 200 | 210 | 195 |
| Temperatures ($T_2$) of single-screw machines | | ° C. | 215 | 218 | 195 | 210 | 195 |
| Morphology | | — | (D) Island Phase | (D) Island Phase | Co-continuous | (D) Sea Phase | (D) Sea Phase |
| Tear Resistance (Slow) | 25° C., 175%, 1 hour | Unit | 6 | 6 | 2 | 6 | 2 |
| | 32° C., 150%, 10 hours | Minutes | <1 | <1 | <1 | <1 | 600 |
| | 38° C., 150%, 10 hours | Minutes | <1 | <1 | <1 | <1 | 600 |
| Elemendorf (MD) test | No. of tears | Unit | 0 | 0 | 0 | 0 | 0 |
| | Avg. tear strength of the torn specimen | N | 580 | 437 | 310 | 386 | 301 |
| Stress relaxation (long-term) | | % | 82.8 | 79.8 | 72.8 | 72.2 | 70.1 |
| \multicolumn{8}{c}{Tension test (TD)} | | | | | | | |
| Tensile strength at 100% elongation | | MPa | 0.95 | 1.07 | 1.41 | 1.29 | 1.65 |
| Tensile strength immediately after 200% elongation | | MPa | 1.16 | 1.3 | 1.79 | 1.56 | 2.05 |
| Tensile strength at 200% elongation and held for 30 seconds | | MPa | 0.99 | 1.08 | 1.39 | 1.18 | 1.55 |
| Stress relaxation | | % | 14.7 | 16.9 | 22.3 | 24.4 | 24.4 |
| \multicolumn{8}{c}{Anisotropy} | | | | | | | |
| Tensile strength at 100% elongation | | Times | 2.0 | 1.9 | 1.4 | 1.1 | 1.0 |
| Tensile strength immediately after 200% elongation | | Times | 2.4 | 2.2 | 1.5 | 1.2 | 1.1 |
| Tensile strength at 200% elongation and held for 30 seconds | | Times | 2.1 | 2.0 | 1.4 | 1.1 | 1.1 |
| Stress relaxation | | Times | 1.8 | 1.6 | 1.2 | 1.1 | 1.1 |

| | | Unit | EX6 | EX7 | EX8 | EX9 | EX10 |
|---|---|---|---|---|---|---|---|
| \multicolumn{8}{c}{Thermoplastic elastomer composition} | | | | | | | |
| Hydrogenated block copolymer (A) | Hydrogenated block copolymer (A1) | phr | 36 | 36 | 40 | 36 | 36 |
| | Hydrogenated block copolymer (A2) | phr | | | | | |
| Thermoplastic resin (B) | Regalite ™ R1125 | phr | 6 | 6 | 6 | 6 | 6 |
| | P4C5B-030 | phr | | 5 | | | |
| | Styrolution PS3190 | phr | 6 | 6 | 2 | | 2 |
| | Kristalex ™ 5140 | phr | | | 4 | 6 | 4 |
| | Piccottex ™ 120 | phr | | | | | |
| Rubber softener (C) | Krystol ™ 550 | phr | 12 | 12 | 8 | 12 | 12 |
| | Renoil 1700W | phr | | | | | |
| Polyolefin elastomers (D) | Vistamaxx ™ 6120 | phr | 30 | 35 | 40 | 40 | 40 |
| | Vistamaxx ™ 3020FL | phr | | | | | |
| Hydrogenated block copolymer (E) | | phr | 10 | | | | |
| Temperatures of twin-screw extruder ($T_1$) | | ° C. | 205 | 205 | 205 | 205 | 205 |
| Temperatures ($T_2$) of single-screw machines | | ° C. | 218 | 218 | 218 | 215 | 215 |
| Morphology | | — | Fine-dispersion | Co-continuous | Fine-dispersion | Fine-dispersion | Fine-dispersion |
| Tear Resistance (Slow) | 25° C., 175%, 1 hour | Unit | 5 | 6 | 6 | 6 | 6 |
| | 32° C., 150%, 10 hours | Minutes | <1 | <1 | 131 | 79 | 10 |
| | 38° C., 150%, 10 hours | Minutes | <1 | <1 | <1 | <1 | <1 |
| Elemendorf (MD) test | No. of tears | Unit | 0 | 0 | 0 | 10 | 3 |
| | Avg. tear strength of the torn specimen | N | 351 | 602 | 804 | —<r | 740 |
| Stress relaxation (long-term) | | % | 73.3 | 68.8 | 70.6 | 70.2 | 71.7 |
| \multicolumn{8}{c}{Tension test (TD)} | | | | | | | |
| Tensile strength at 100% elongation | | MPa | 1.16 | 1.65 | 1.51 | 1.37 | 1.27 |
| Tensile strength immediately after 200% elongation | | MPa | 1.41 | 2.08 | 1.79 | 1.58 | 1.5 |
| Tensile strength at 200% elongation and held for 30 seconds | | MPa | 1.15 | 1.52 | 1.39 | 1.22 | 1.17 |
| Stress relaxation | | % | 18.4 | 26.9 | 22.3 | 22.8 | 22.0 |

TABLE 2A-continued

| Anisotropy | | | | | | |
|---|---|---|---|---|---|---|
| Tensile strength at 100% elongation | Times | 1.5 | 1.6 | 1.6 | 1.5 | 1.5 |
| Tensile strength immediately after 200% elongation | Times | 1.7 | 1.7 | 1.7 | 1.6 | 1.7 |
| Tensile strength at 200% elongation and held for 30 seconds | Times | 1.6 | 1.6 | 1.6 | 1.5 | 1.6 |
| Stress relaxation | Times | 1.4 | 1.2 | 1.3 | 1.2 | 1.2 |

TABLE 2B

| | | Unit | EX 11 | EX 12 | EX 13 | EX 14 | EX 15 | EX 16 |
|---|---|---|---|---|---|---|---|---|
| Thermoplastic elastomer composition | | | | | | | | |
| Hydrogenated block copolymer (A) | Hydrogenated block copolymer (A1) | phr | 30 | 30 | 36 | 36 | | 36 |
| | Hydrogenated block copolymer (A2) | phr | | | | | 36 | |
| Thermoplastic resin (B) | Regalite ™ R1125 | phr | 5 | 5 | 6 | | 6 | |
| | P4C5B-030 | phr | | | | | | |
| | Styrolution PS3190 | phr | | | 2 | 2 | 2 | |
| | Kristalex ™ 5140 | phr | 5 | 5 | | 4 | 4 | 4 |
| | Piccottex ™ 120 | phr | | | 4 | | | |
| | Krystalex ™ 3100 | phr | | | | | | |
| | Piccottex ™ 100 | phr | | | | | | |
| Rubber softener (C) | Krystol ™ 550 | phr | 10 | 10 | 12 | 18 | 12 | 20 |
| | Renoil 1700W | phr | | | | | | |
| Polyolefin elastomers (D) | Vistamaxx ™ 6120 | phr | 50 | 40 | 40 | 40 | 40 | 40 |
| Hydrogenated block copolymer (E) | | phr | | 10 | | | | |
| Temperatures of twin-screw extruder ($T_1$) | | °C. | 205 | 205 | 190 | 190 | 190 | 190 |
| Temperatures ($T_2$) of single-screw machines | | °C. | 215 | 215 | 215 | 220 | 220 | 212 |
| Morphology | | — | Fine-dispersion | Fine-dispersion | Fine-dispersion | Fine-dispersion | Fine-dispersion | Fine-dispersion |
| Tear Resistance (Slow) | 25° C., 175%, 1 hour | Unit | 6 | 3 | 6 | 6 | 6 | 2 |
| | 32° C., 150%, 10 hours | Minutes | <1 | <1 | 104 | 24 | 392 | <1 |
| | 38° C., 150%, 10 hours | Minutes | <1 | <1 | <1 | <1 | 9 | <1 |
| Elemendorf (MD) test | No. of tears | Unit | 6 | 4 | 5 | 10 | 10 | 0 |
| | Avg. tear strength of the torn specimen | N | 776 | 800 | 813 | —<r | —<r | 589 |
| Stress relaxation (long-term) | | % | 69.7 | 69.2 | 73.3 | 73.1 | 74.7 | 74.0 |
| Tension test (TD) | | | | | | | | |
| Tensile strength at 100% elongation | | MPa | 1.62 | 1.45 | 1.37 | 1.34 | 1.4 | 1.25 |
| Tensile strength immediately after 200% elongation | | MPa | 1.88 | 1.68 | 1.6 | 1.59 | 1.7 | 1.46 |
| Tensile strength at 200% elongation and held for 30 seconds | | MPa | 1.42 | 1.3 | 1.25 | 1.24 | 1.35 | 1.15 |
| Stress relaxation | | % | 24.5 | 22.6 | 21.9 | 22.0 | 20.6 | 21.2 |
| Anisotropy | | | | | | | | |
| Tensile strength at 100% elongation | | Times | 1.2 | 1.2 | 1.5 | 1.6 | 1.4 | 1.6 |
| Tensile strength immediately after 200% elongation | | Times | 1.2 | 1.2 | 1.6 | 1.7 | 1.5 | 1.6 |
| Tensile strength at 200% elongation and held for 30 seconds | | Times | 1.2 | 1.2 | 1.5 | 1.6 | 1.4 | 1.5 |
| Stress relaxation | | Times | 1.1 | 1.1 | 1.2 | 1.3 | 1.2 | 1.2 |

| | | Unit | EX 17 | EX 18 | EX 19 | EX 20 | EX 21 |
|---|---|---|---|---|---|---|---|
| Thermoplastic elastomer composition | | | | | | | |
| Hydrogenated block copolymer (A) | Hydrogenated block copolymer (A1) | phr | 36 | | 36 | 36 | 36 |
| | Hydrogenated block copolymer (A2) | phr | | 40 | | | |
| Thermoplastic resin (B) | Regalite ™ R1125 | phr | | 6 | 6 | 6 | 6 |
| | P4C5B-030 | phr | | | | | |
| | Styrolution PS3190 | phr | 4 | 2 | 2 | 2 | 2 |
| | Kristalex ™ 5140 | phr | 8 | 4 | 4 | | |
| | Piccottex ™ 120 | phr | | | | | |
| | Krystalex ™ 3100 | phr | | | | 4 | |
| | Piccottex ™ 100 | phr | | | | | 4 |
| Rubber softener (C) | Krystol ™ 550 | phr | 12 | 8 | | 12 | 12 |
| | Renoil 1700W | phr | | | 12 | | |
| Polyolefin elastomers (D) | Vistamaxx ™ 6120 | phr | 40 | 40 | 40 | 40 | 40 |
| Hydrogenated block copolymer (E) | | phr | 200 | 195 | 205 | 200 | 200 |
| Temperatures of twin-screw extruder ($T_1$) | | °C. | 215 | 215 | 215 | 215 | 215 |
| Temperatures ($T_2$) of single-screw machines | | °C. | Fine-dispersion | Fine-dispersion | Fine-dispersion | Fine-dispersion | Fine-dispersion |
| Morphology | | — | dispersion | dispersion | dispersion | dispersion | dispersion |

TABLE 2B-continued

|  |  | Unit |  |  |  |  |  |
|---|---|---|---|---|---|---|---|
| Tear Resistance (Slow) | 25° C., 175%, 1 hour | Unit | 6 | 6 | 6 | 6 | 6 |
|  | 32° C., 150%, 10 hours | Minutes | 45 | 292 | 19 | <1 | 5 |
|  | 38° C., 150%, 10 hours | Minutes | <1 | <1 | <1 | <1 | <1 |
| Elemendorf (MD) test | No. of tears | Unit | 1 | 0 | 4 | 10 | 10 |
|  | Avg. tear strength of the torn specimen | N | 622 | 547 | 760 | —<r | —<r |
| Stress relaxation (long-term) |  | % | 72.7 | 73.7 | 73.0 | 73.2 | 72.9 |
| Tension test (TD) | | | | | | | |
| Tensile strength at 100% elongation | | MPa | 1.42 | 1.54 | 1.31 | 1.21 | 1.24 |
| Tensile strength immediately after 200% elongation | | MPa | 1.74 | 1.86 | 1.54 | 1.41 | 1.44 |
| Tensile strength at 200% elongation and held for 30 seconds | | MPa | 1.35 | 1.46 | 1.2 | 1.1 | 1.12 |
| Stress relaxation | | % | 22.4 | 21.5 | 22.1 | 22.0 | 22.2 |
| Anisotropy | | | | | | | |
| Tensile strength at 100% elongation | | Times | 1.5 | 1.3 | 1.4 | 1.5 | 1.5 |
| Tensile strength immediately after 200% elongation | | Times | 1.7 | 1.3 | 1.5 | 1.7 | 1.6 |
| Tensile strength at 200% elongation and held for 30 seconds | | Times | 1.6 | 1.3 | 1.4 | 1.6 | 1.5 |
| Stress relaxation | | Times | 1.2 | 1.2 | 1.2 | 1.2 | 1.2 |

TABLE 2C

|  |  | Unit | EX 22 | EX 23 | EX 24 | EX 25 | EX 26 | EX 27 |
|---|---|---|---|---|---|---|---|---|
| Thermoplastic elastomer composition | | | | | | | | |
| Hydrogenated block copolymer (A) | Hydrogenated block copolymer (A1) | phr | 36 | | | | | |
|  | Hydrogenated block copolymer (A2) | phr | | 36 | 36 | 40 | 40 | 36 |
| Thermoplastic resin (B) | Regalite ™ R1125 | phr | 6 | 6 | 6 | 6 | 6 | 6 |
|  | P4C5B-030 | phr | | | | | | |
|  | Styrolution PS3190 | phr | 2 | | | | | |
|  | Kristalex ™ 5140 | phr | 4 | | | | | |
|  | Piccottex ™ 120 | phr | | 6 | 6 | 6 | 6 | 6 |
| Rubber softener (C) | Krystol ™ 550 | phr | 12 | 12 | 12 | 8 | 8 | 12 |
|  | Renoil 1700W | phr | | | | | | |
| Polyolefin elastomers (D) | Vistamaxx ™ 6120 | phr | 20 | 37.5 | 35 | 35 | 37.5 | 32.5 |
|  | Vistamaxx ™ 3020FL | phr | 20 | 2.5 | 5 | 5 | 2.5 | 7.5 |
| Hydrogenated block copolymer (E) | | phr | | | | | | |
| Temperatures of twin-screw extruder ($T_1$) | | ° C. | 200 | 205 | 195 | 190 | 190 | 190 |
| Temperatures ($T_2$) of single-screw machines | | ° C. | 215 | 220 | 220 | 220 | 225 | 220 |
| Morphology | | — | Fine-dispersion | Fine-dispersion | Fine-dispersion | Fine-dispersion | Fine-dispersion | Fine-dispersion |
| Tear Resistance (Slow) | 25° C., 175%, 1 hour | Unit | 6 | 6 | 6 | 6 | 6 | 6 |
|  | 32° C., 150%, 10 hours | Minutes | 600 | 571 | 600 | 600 | 600 | 600 |
|  | 38° C., 150%, 10 hours | Minutes | 600 | 28 | 88 | 352 | 103 | 202 |
| Elemendorf (MD) test | No. of tears | Unit | 4 | 10 | 10 | 10 | 10 | 10 |
|  | Avg. tear strength of the torn specimen | N | —<r | —<r | —<r | —<r | —<r | —<r |
| Stress relaxation (long-term) | | % | 69.3 | 76.3 | 75.9 | 74.4 | 75.9 | 75.6 |
| Tension test (TD) | | | | | | | | |
| Tensile strength at 100% elongation | | MPa | 1.78 | 1.5 | 1.57 | 1.78 | 1.69 | 1.65 |
| Tensile strength immediately after 200% elongation | | MPa | 2.13 | 1.74 | 1.81 | 2.05 | 1.94 | 1.92 |
| Tensile strength at 200% elongation and held for 30 seconds | | MPa | 1.59 | 1.36 | 1.42 | 1.59 | 1.51 | 1.49 |
| Stress relaxation | | % | 25.4 | 21.8 | 21.5 | 22.4 | 22.2 | 22.4 |
| Anisotropy | | | | | | | | |
| Tensile strength at 100% elongation | | Times | 1.4 | 1.4 | 1.4 | 1.3 | 1.3 | 1.4 |
| Tensile strength immediately after 200% elongation | | Times | 1.5 | 1.4 | 1.4 | 1.4 | 1.4 | 1.4 |
| Tensile strength at 200% elongation and held for 30 seconds | | Times | 1.4 | 1.3 | 1.4 | 1.3 | 1.3 | 1.3 |
| Stress relaxation | | Times | 1.1 | 1.1 | 1.2 | 1.2 | 1.2 | 1.1 |

|  |  | Unit | EX 28 | EX 29 | EX 30 | EX 31 | EX 32 |
|---|---|---|---|---|---|---|---|
| Thermoplastic elastomer composition | | | | | | | |
| Hydrogenated block copolymer (A) | Hydrogenated block copolymer (A1) | phr | | | | | |
|  | Hydrogenated block copolymer (A2) | phr | 36 | 40 | 40 | 40 | 40 |
| Thermoplastic resin (B) | Regalite ™ R1125 | phr | 6 | 6 | 8 | 6 | 10 |
|  | P4C5B-030 | phr | | | | | |
|  | Styrolution PS3190 | phr | | | | | |
|  | Kristalex ™ 5140 | phr | | | | | |
|  | Piccottex ™ 120 | phr | 6 | 6 | 6 | 8 | 6 |

TABLE 2C-continued

| | | | | | | | |
|---|---|---|---|---|---|---|---|
| Rubber softener (C) | Krystol ™ 550 | phr | | | 6 | 6 | 4 |
| | Renoil 1700W | phr | 12 | 8 | | | |
| Polyolefin elastomers (D) | Vistamaxx ™ 6120 | phr | 35 | 35 | 35 | 35 | 35 |
| | Vistamaxx ™ 3020FL | phr | 5 | 5 | 5 | 5 | 5 |
| Hydrogenated block copolymer (E) | | phr | | | | | |
| Temperatures of twin-screw extruder (T₁) | | ° C. | 190 | 190 | 190 | 190 | 190 |
| Temperatures (T₂) of single-screw machines | | ° C. | 225 | 220 | 225 | 225 | 225 |
| Morphology | | — | Fine-dispersion | Fine-dispersion | Fine-dispersion | Fine-dispersion | Fine-dispersion |
| Tear Resistance (Slow) | 25° C., 175%, 1 hour | Unit | 6 | 6 | 6 | 6 | 6 |
| | 32° C., 150%, 10 hours | Minutes | 600 | 600 | 600 | 600 | 600 |
| | 38° C., 150%, 10 hours | Minutes | 165 | 600 | 527 | 509 | 600 |
| Elemendorf (MD) test | No. of tears | Unit | 10 | 10 | 10 | 10 | 10 |
| | Avg. tear strength of the torn specimen | N | —<r | —<r | —<r | —<r | —<r |
| Stress relaxation (long-term) | | % | 76.0 | 74.5 | 72 | 71.6 | 71.7 |
| Tension test (TD) | | | | | | | |
| Tensile strength at 100% elongation | | MPa | 1.56 | 1.78 | 1.81 | 1.89 | 1.87 |
| Tensile strength immediately after 200% elongation | | MPa | 1.8 | 2.08 | 2.1 | 2.25 | 2.15 |
| Tensile strength at 200% elongation and held for 30 seconds | | MPa | 1.39 | 1.6 | 1.62 | 1.72 | 1.65 |
| Stress relaxation | | % | 22.8 | 23.1 | 22.9 | 23.6 | 23.3 |
| Anisotropy | | | | | | | |
| Tensile strength at 100% elongation | | Times | 1.5 | 1.3 | 1.3 | 1.4 | 1.3 |
| Tensile strength immediately after 200% elongation | | Times | 1.5 | 1.4 | 1.4 | 1.4 | 1.4 |
| Tensile strength at 200% elongation and held for 30 seconds | | Times | 1.4 | 1.3 | 1.3 | 1.3 | 1.3 |
| Stress relaxation | | Times | 1.2 | 1.1 | 1.2 | 1.2 | 1.2 |

TABLE 2D

| | | Unit | CEX 1 | CEX 2 | CEX 3 | CEX 4 | CEX 5 |
|---|---|---|---|---|---|---|---|
| Thermoplastic elastomer composition | | | | | | | |
| Hydrogenated block copolymer (A) | Hydrogenated block copolymer (A1) | phr | 60 | | 25 | 25 | 12 |
| | Hydrogenated block copolymer (A2) | phr | | | | | |
| Thermoplastic resin (B) | Regalite ™ R1125 | phr | 10 | | | | 2 |
| | P4C5B-030 | phr | | | | | |
| | Styrolution PS3190 | phr | 10 | | | | 2 |
| | Kristalex ™ 5140 | phr | | | | | |
| | Piccottex ™ 120 | phr | | | | | |
| Rubber softener (C) | Krystol ™ 550 | phr | 20 | | | 5 | 4 |
| | Renoil 1700W | phr | | | | | |
| Polyolefin elastomers (D) | Vistamaxx ™ 6120 | phr | | 100 | 50 | 50 | 80 |
| | Vistamaxx ™ 3020FL | phr | | | | | |
| Hydrogenated block copolymer (E) | | phr | | | 25 | 20 | |
| Temperatures of twin-screw extruder (T₁) | | ° C. | 205 | — | 180 | 210 | 210 |
| Temperatures (T₂) of single-screw machines | | ° C. | 215 | 200 | 215 | 215 | 230 |
| Morphology | | — | (A) | (D) | Fine-dispersion | Fine-dispersion | (D) Sea Phase |
| Tear Resistance (Slow) | 25° C., 175%, 1 hour | Unit | 6 | 0 | 0 | 0 | 0 |
| | 32° C., 150%, 10 hours | Minutes | 600 | 600 | <1 | <1 | 600 |
| | 38° C., 150%, 10 hours | Minutes | 347 | 600 | <1 | <1 | 600 |
| Elemendorf (MD) test | No. of tears | Unit | 0 | 0 | 0 | 0 | 0 |
| | Avg. tear strength of the torn specimen | N | 712 | 491 | 253 | 219 | 255 |
| Stress relaxation (long-term) | | % | 84.9 | 66.5 | 68.6 | 68.8 | 70.5 |
| Tension test (TD) | | | | | | | |
| Tensile strength at 100% elongation | | MPa | 0.94 | 2.52 | 1.77 | 1.62 | 1.67 |
| Tensile strength immediately after 200% elongation | | MPa | 1.19 | 2.84 | 2.03 | 1.87 | 1.93 |
| Tensile strength at 200% elongation and held for 30 seconds | | MPa | 1.05 | 2.1 | 1.57 | 1.45 | 1.46 |
| Stress relaxation | | % | 11.8 | 26.1 | 22.7 | 22.5 | 24.4 |
| Anisotropy | | | | | | | |
| Tensile strength at 100% elongation | | Times | 2.5 | 1.0 | 1.0 | 1.0 | 1.0 |
| Tensile strength immediately after 200% elongation | | Times | 2.7 | 1.0 | 1.0 | 1.0 | 1.0 |
| Tensile strength at 200% elongation and held for 30 seconds | | Times | 2.3 | 1.0 | 1.0 | 1.0 | 1.0 |
| Stress relaxation | | Times | 2.2 | 1.0 | 1.0 | 1.0 | 1.0 |

Examples 1 to 32 using a thermoplastic elastomer composition containing a hydrogenated block copolymer (A), a thermoplastic resin (B), a softener for rubber (C), and a polyolefin elastomer (D) satisfying specific conditions, respectively, show that stress relaxation in anisotropy is as low as about 2.0 times or less, and anisotropy is reduced. The thermoplastic elastomer compositions of Examples 1 to 32 each sufficiently satisfy the tear strength, stress relaxation property and tensile strength required for applications such as films and sheets. Further, in the thermoplastic elastomer compositions of Examples 8, 13, 15, 18, 23 and 24, the tear strength at 32° C. is improved, and in the thermoplastic elastomer compositions of Examples 5, 22, 25 to 32, the tear strength at 32° C. and the tear strength at 38° C. are improved.

Figure 2:
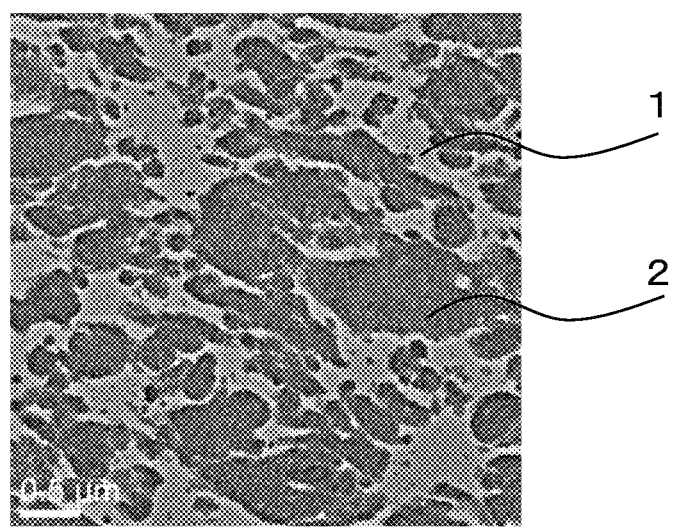
FIG. 2 is a cross-sectional image of the thermoplastic elastomer composition (film) of Example 6 taken (at 5000× magnification) using a transmission electron microscope (TEM).
Figure 3:
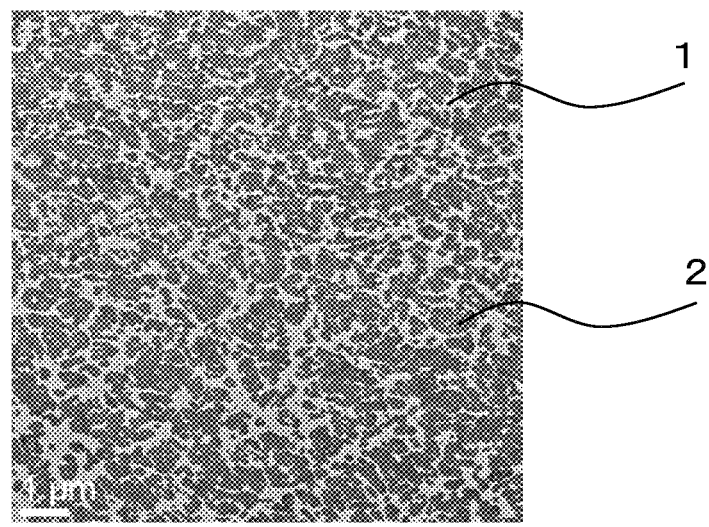
FIG. 3 is a cross-sectional image of the thermoplastic elastomer composition (film) of Example 8 taken (at 2000× magnification) using a transmission electron microscope (TEM).
Figure 4:
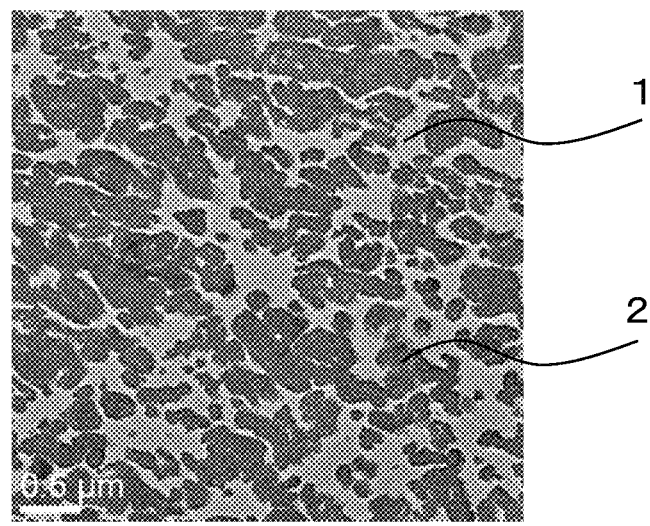
FIG. 4 is a cross-sectional image of the thermoplastic elastomer composition (film) of Example 8 taken (at 5000× magnification) using a transmission electron microscope (TEM).

From the cross-sectional images of the thermoplastic elastomer composition (film) of Example 6 shown in FIGS. 1 and 2 and the cross-sectional images of the thermoplastic elastomer composition (film) of Example 8 shown in FIGS. 3 and 4, it can be seen that the thermoplastic elastomer compositions (film) of Example 6 and Example 8 both have a fine dispersion of the polyolefin elastomer (D) and components other than the polyolefin elastomer (D) and are excellent in the tear strength.

Figure 5:
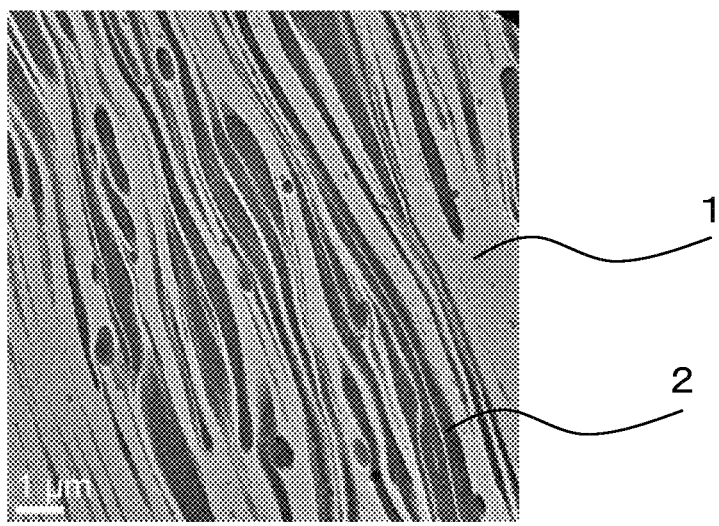
FIG. 5 is a cross-sectional image of the thermoplastic elastomer composition (film) of Example 5 taken (at 2000× magnification) using a transmission electron microscope (TEM).
Figure 6:
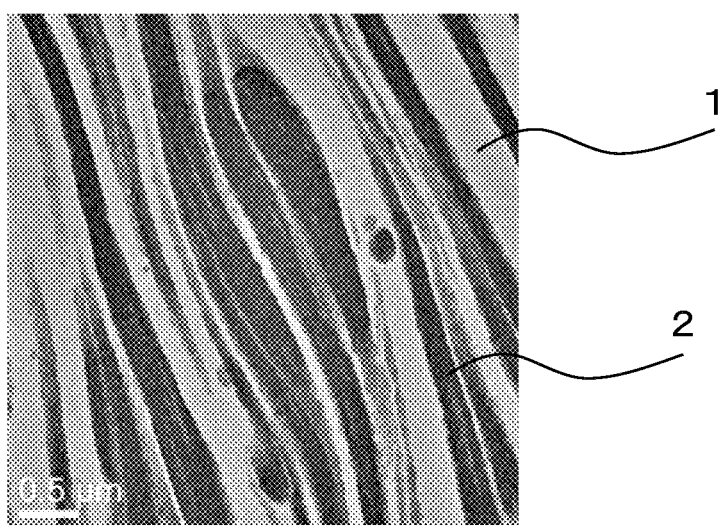
FIG. 6 is a cross-sectional image of the thermoplastic elastomer composition (film) of Example 5 taken (at 5000× magnification) using a transmission electron microscope (TEM).

From the cross-sectional images of the thermoplastic elastomer composition (film) of Example 5 shown in FIGS. 5 and 6, it can be seen that the thermoplastic elastomer composition (film) of Example 5 is excellent in the tear strength because the polyolefin elastomer (D) is the sea phase and the components other than the polyolefin elastomer (D) are the island phase. Further, in the cross-sectional image of the film of FIG. 5, the ratio of sea phase was found to be 59.2% when the imaging size was confirmed in the range of 10.6 μm×10.6 μm in the observation field of view. Further, in the cross-sectional image of the film of FIG. 5, the observation field of view was confirmed with the photographing size in the range of 4.25 μm×4.25 μm, and the length in the long axis direction and the length in the short axis direction of the island were measured from the typical image in the range of 2 μm square by using DigitalMicrograph software (Gatan Inc.), respectively, and the long axis of the island phase was 1.8 μm, the short axis of the island phase was 0.23 μm, and the aspect ratio (long axis/short axis) was 8.

Figure 7:
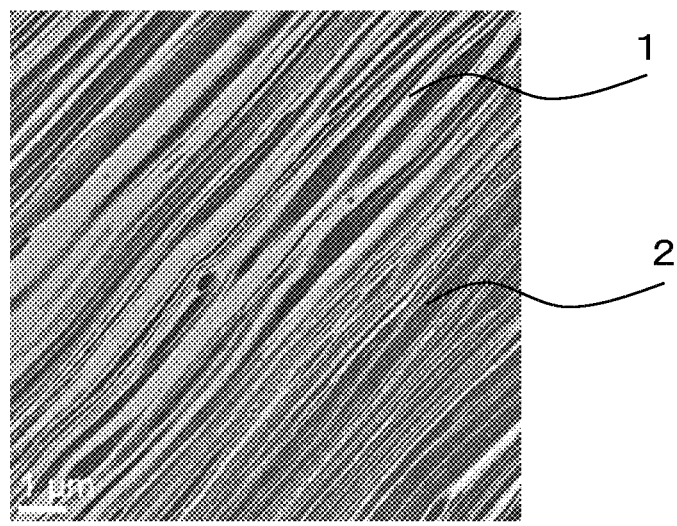
FIG. 7 is a cross-sectional image obtained by photographing a cross-sectional image of the thermoplastic elastomer composition (film) of Example 3 (at 2000× magnification) using a transmission electron microscope (TEM).
Figure 8:
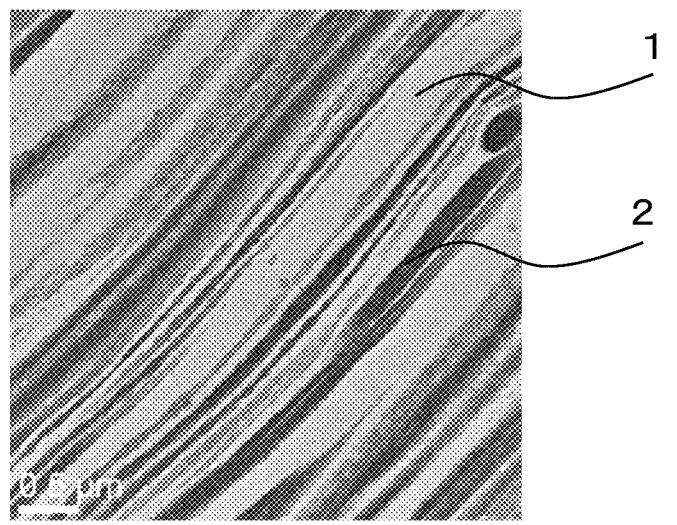
FIG. 8 is a cross-sectional image obtained by photographing a cross-sectional image of the thermoplastic elastomer composition (film) of Example 3 using a transmission electron microscope (TEM) (at 5000× magnification).

From the cross-sectional images of the thermoplastic elastomer composition (film) of Example 3 shown in FIGS. 7 and 8, it can be seen that the thermoplastic elastomer composition (film) of Example 3 forms a co-continuous structure of the polyolefin elastomer (D) and components other than the polyolefin elastomer (D).

EXPLANATION OF CODES IN FIGURES

1 Polyolefin elastomer component (D)
2 Components other than polyolefin elastomer component (D)

The invention claimed is:
1. A thermoplastic elastomer composition comprising a hydrogenated block copolymer component (A), a thermoplastic resin component (B) and a rubber softener component (C), wherein:
 (1) the hydrogenated block copolymer component (A) comprises a hydrogenated block copolymer having
  (i) two or more polymer blocks (a) containing structural units derived from an aromatic vinyl compound, and one or more polymer blocks (b) containing a structural unit derived from isoprene and/or a structural unit derived from 1,3-butadiene;
  (ii) a glass transition temperature of less than about −45° C. (measured as set forth in the examples), and
  (iii) a crystallization peak temperature (Tc) of from about −3° C. to about 15° C. (measured as set forth in the examples);
 (2) the thermoplastic elastomer composition further comprises a polyolefin elastomer component (D); and
 (3) the thermoplastic elastomer composition comprises from about 18 to about 60 parts by mass of the hydrogenated block copolymer component (A), from about 3 to about 24 parts by mass of the thermoplastic resin component (B), from about 3 to about 25 parts by mass of the rubber softener component (C), and from about 5 to about 76 parts by mass of a polyolefin elastomer component (D), based on 100 parts by mass (A)+(B)+(C)+(D).

2. The thermoplastic elastomer composition according to claim 1, wherein the polymer block (b) of the hydrogenated block copolymer contains structural units derived from isoprene and structural units derived from 1,3-butadiene.

3. The thermoplastic elastomer composition according to claim 2, wherein a mass ratio of the structural units derived from isoprene to the structural unit derived from 1,3-butadiene is from about 49.9/50.1 to about 40.1/59.9.

4. The thermoplastic elastomer composition according to claim 2, having a sea-island structure of a sea phase and an island phase, wherein the sea phase is one of (i) the polyolefin elastomer (D) or (ii) components other than the polyolefin elastomer (D), and the island phase is the other of (i) or (ii), and wherein the island phase comprises a plurality of islands having on average a long axis of about 100 nm or more (measured as set forth in the examples).

5. The thermoplastic elastomer composition according to claim 4, wherein the island phase comprises islands that have on average a long axis of about 5 μm or less and an aspect ratio (long axis/short axis) of about 3 or less (measured as set forth in the examples).

6. The thermoplastic elastomer composition according to claim 1, wherein the polymer bock (b) of the hydrogenated block copolymer (A) contains only a structural unit derived from 1,3-butadiene.

7. The thermoplastic elastomer composition according to claim 6, having a sea-island structure of a sea phase and an island phase, wherein the sea phase is one of (i) the polyolefin elastomer (D) or (ii) components other than the polyolefin elastomer (D), and the island phase is the other of (i) or (ii), and wherein the island phase comprises a plurality of islands having on average a long axis of about 100 nm or more (measured as set forth in the examples).

8. The thermoplastic elastomer composition according to claim 7, wherein the island phase comprises islands that have on average a long axis of about 5 μm or less and an aspect ratio (long axis/short axis) of about 3 or less (measured as set forth in the examples).

9. The thermoplastic elastomer composition according to claim 1, wherein a content of the polymer blocks (a) in the hydrogenated block copolymer is from about 20% by mass to about 34% by mass, based on the total mass of the hydrogenated block copolymer.

10. The thermoplastic elastomer composition according to claim 1, wherein the thermoplastic resin component (B) comprises a polystyrene-based resin.

11. The thermoplastic elastomer composition according to claim 1, further comprising from about 3 to about 15 parts by mass of a hydrogenated block copolymer component (E), based on the total mass of the thermoplastic elastomer composition, wherein hydrogenated block copolymer component (E) comprises a hydrogenated block copolymer obtained by hydrogenating a polymer block (x) containing more than about 70% by mass of a structural unit derived from an aromatic vinyl compound and a polymer block (y) containing about 30% by mass or more of a structural unit derived from at least one selected from the group consisting of a conjugated diene compound and isobutylene; and wherein the hydrogenated block copolymer has a glass transition temperature (Tg) of from about −45° C. to about 30° C., and the polymer block (x) in the hydrogenated block copolymer is present in an amount of from about 4% by mass to about 30% by mass based on the total mass of the hydrogenated block copolymer.

12. The thermoplastic elastomer composition according to claim 1, wherein the polyolefin elastomer (D) contains a polypropylene-based elastomer containing a structural unit derived from ethylene, and the content of the structural unit derived from ethylene is from about 13.0% by mass to about 15.9% by mass based on the total mass of the polypropylene-based elastomer.

13. A film or sheet of a thermoplastic elastomer composition comprising a hydrogenated block copolymer component (A), a thermoplastic resin component (B) and a rubber softener component (C), wherein:
  (1) the hydrogenated block copolymer component (A) comprises a hydrogenated block copolymer having
    (i) two or more polymer blocks (a) containing structural units derived from an aromatic vinyl compound, and one or more polymer blocks (b) containing a structural unit derived from isoprene and/or a structural unit derived from 1,3-butadiene;
    (ii) a glass transition temperature of less than about −45° C. (measured as set forth in the examples), and
    (iii) a crystallization peak temperature (Tc) of from about −3° C. to about 15° C. (measured as set forth in the examples);
  (2) the thermoplastic elastomer composition further comprises a polyolefin elastomer component (D); and
  (3) the thermoplastic elastomer composition comprises from about 18 to about 60 parts by mass of the hydrogenated block copolymer component (A), from about 3 to about 24 parts by mass of the thermoplastic resin component (B), from about 3 to about 25 parts by mass of the rubber softener component (C), and from about 5 to about 76 parts by mass of a polyolefin elastomer component (D), based on 100 parts by mass (A)+(B)+(C)+(D).

14. The film or sheet of claim 13, wherein the thermoplastic elastomer composition has a sea-island structure of a sea phase and an island phase, wherein the sea phase is one of (i) the polyolefin elastomer (D) or (ii) components other than the polyolefin elastomer (D), and the island phase is the other of (i) or (ii), and wherein the island phase comprises a plurality of islands having on average a long axis of about 100 nm or more (measured as set forth in the examples).

15. The film or sheet of claim 14, wherein the island phase comprises islands that have on average a long axis of about 5 μm or less and an aspect ratio (long axis/short axis) of about 3 or less (measured as set forth in the examples).

* * * * *